(12) United States Patent
Nomura

(10) Patent No.: US 7,450,832 B2
(45) Date of Patent: Nov. 11, 2008

(54) IMAGING DEVICE HAVING AN OPTICAL IMAGE STABILIZER

(75) Inventor: Hiroshi Nomura, Saitama (JP)

(73) Assignee: HOYA Corporation, Tokyo (JP)

( * ) Notice: Subject to any disclaimer, the term of this patent is extended or adjusted under 35 U.S.C. 154(b) by 372 days.

(21) Appl. No.: 11/289,481

(22) Filed: Nov. 30, 2005

(65) Prior Publication Data

US 2006/0115251 A1 Jun. 1, 2006

(30) Foreign Application Priority Data

Dec. 1, 2004 (JP) ............................. 2004-349184
Dec. 22, 2004 (JP) ............................. 2004-370894

(51) Int. Cl.
*G03B 17/00* (2006.01)
(52) U.S. Cl. ..................................... 396/55; 348/208.7
(58) Field of Classification Search .................. 396/55; 348/208.4–208.5, 208.7–208.8, 208.11
See application file for complete search history.

(56) References Cited

U.S. PATENT DOCUMENTS

| | | | |
|---|---|---|---|
| 4,768,048 A | | 8/1988 | Wakabayashi |
| 5,172,276 A | * | 12/1992 | Ueyama et al. ............. 359/813 |
| 5,416,558 A | * | 5/1995 | Katayama et al. ............ 396/52 |
| 5,430,516 A | | 7/1995 | Uziie et al. |
| 5,684,640 A | | 11/1997 | Tanaka et al. |
| 5,739,962 A | | 4/1998 | Asakura et al. |
| 5,842,053 A | * | 11/1998 | Ueyama et al. ............... 396/55 |
| 5,995,762 A | * | 11/1999 | Enomoto et al. .............. 396/55 |
| 6,031,998 A | * | 2/2000 | Shono ........................... 396/75 |
| 6,252,713 B1 | | 6/2001 | Hirunuma et al. |
| 6,266,190 B1 | | 7/2001 | Hirunuma et al. |
| 6,366,323 B1 | | 4/2002 | Shono |
| 6,978,089 B2 | | 12/2005 | Nomura et al. |
| 2002/0089749 A1 | | 7/2002 | Hirunuma et al. |
| 2003/0067544 A1 | * | 4/2003 | Wada ....................... 348/208.7 |
| 2003/0156832 A1 | | 8/2003 | Nomura et al. |

FOREIGN PATENT DOCUMENTS

JP 6-46314 2/1994

(Continued)

OTHER PUBLICATIONS

U.S. Appl. No. 11/289,557 to Nomura, which was filed Nov. 30, 2005.

(Continued)

*Primary Examiner*—W. B. Perkey
(74) *Attorney, Agent, or Firm*—Greenblum & Bernstein, P.L.C.

(57) ABSTRACT

An imaging device includes an image-shake detector for detecting vibration applied to a photographing optical system; first and second movable frames, for supporting an image-stabilizing optical element, which constitutes a part of the photographing optical system, so as to be movable in two directions different from each other in a plane orthogonal to a common optical axis of the photographing optical system; first and second biasing devices for biasing the first and second movable frames in the respective moving directions thereof; first and second stopper devices for determining movement extremities of the first and second movable frames, respectively, in respective biasing directions of the first and second biasing devices; and a driving device for counteracting image shake by driving the first and second stopper devices in accordance with an output of the image-shake detector to thereby move the first and second movable frames, respectively.

14 Claims, 24 Drawing Sheets

FOREIGN PATENT DOCUMENTS

| | | |
|---|---|---|
| JP | 2003-110928 | 4/2003 |
| JP | 2003-111449 | 4/2003 |
| JP | 2004-48266 | 2/2004 |

OTHER PUBLICATIONS

U.S. Appl. No. 11/289,478 to Nomura, which was filed Nov. 30, 2005.
U.S. Appl. No. 11/289,594 to Nomura, which was filed Nov. 30, 2005.
U.S. Appl. No. 11/289,560 to Nomura, which was filed Nov. 30, 2005.
U.S. Appl. No. 11/289,600 to Nomura, which was filed Nov. 30, 2005.
U.S. Appl. No. 11/289,602 to Nomura, which was filed Nov. 30, 2005.
U.S. Appl. No. 11/289,556 to Nomura, which was filed Nov. 30, 2005.
U.S. Appl. No. 11/289,558 to Nomura, which was filed Nov. 30, 2005.
U.S. Appl. No. 11/289,601 to Nomura, which was filed Nov. 30, 2005.
U.S. Appl. No. 11/289,739 to Nomura, which was filed Nov. 30, 2005.
English Abstract of JP 6-46314, Feb. 18, 1994.
English Abstract of JP2003-110928, Apr. 11, 2003.
English Abstract of JP2003-111449, Apr. 11, 2003.
English Abstract of JP2004-48266, Feb. 12, 2004.
Reissue U.S. Appl. Nos. 10/815,193 and 10/815,194, filed Apr. 1, 2004.

* cited by examiner

IMAGING DEVICE HAVING AN OPTICAL IMAGE STABILIZER

BACKGROUND OF THE INVENTION

1. Field of the Invention

The present invention relates to an imaging device, more specifically relates to an imaging device having an optical image stabilizer for counteracting image shake due to vibrations such as hand shake (camera shake).

2. Description of the Related Art

Imaging devices such as cameras which come with image stabilization or variants such as anti-shake for preventing image shake from occurring on an imaging surface when vibrations such as hand shake is applied to the imaging device are in practical use. However, such imaging devices having an optical image stabilizer (optical shift image stabilizer) are prone to being bulky and heavy.

SUMMARY OF THE INVENTION

The present invention provides an imaging device capable of correcting image shake by use of a compact and low cost configuration.

According to an aspect of the present invention, an imaging device is provided, including an image-shake detector for detecting a direction and magnitude of an amount of vibration applied to a photographing optical system; first and second movable frames, each for supporting a common image-stabilizing optical element, which constitutes a part of the photographing optical system, so as to be movable in two directions different from each other in a plane orthogonal to a common optical axis of the photographing optical system; first and second biasing devices for biasing the first and second movable frames, respectively, in the respective moving directions thereof; first and second stopper devices for determining movement extremities of the first and second movable frames, respectively, in respective biasing directions of the first and second biasing devices; and a driving device for counteracting image shake by driving the first and second stopper devices in accordance with an output of the image-shake detector to thereby move the first and second movable frames, respectively.

It is desirable for the first movable frame to directly support the common image-stabilizing optical element, and for the second movable frame to support the first movable frame so as to be relatively movable thereto.

It is desirable for the first and second movable frames to linearly move in respective directions perpendicular to each other within the plane orthogonal to the common optical axis.

It is desirable for the driving device to include a first swing member which is rotatable about a rotation axis parallel to the common optical axis of the photographing optical system, wherein the first stopper device is provided on the first swing member at a position eccentric to the rotation axis; a second swing member which is rotatable about a rotation axis parallel to the common optical axis of the photographing optical system, wherein the second stopper device is provided on the second swing member at a position eccentric to the rotation axis; and a swing member driving device for rotating each of the first swing member and the second swing member by a predetermined angle in accordance with the output of the image-shake detector.

It is desirable for the first and second swing members to be pivotally supported by a common shaft at the rotation axis.

The first and second swing members can be pair of swing levers which extend in a direction perpendicular to the common optical axis and are substantially parallel to each other.

It is desirable for at least one of the first and the second stopper devices to include a component force generating surface which abuts against corresponding one of the first and second movable frames and applies thereto a moving force component in a direction substantially perpendicular to a tangent of a rotational motion trajectory of one of the first and second swing members provided with the one of the first and second stopper devices having the component force generating surface.

It is desirable for at least one of the first and second stopper devices to include a pin which abuts against a position restricting surface of a corresponding one of the first and second movable frames.

It is desirable for the swing member driving device for rotating the first and second swing members to include first and second actuators having first and second rotational shafts, respectively; a first linearly moving member which is moved forward and rearward in a direction parallel to the rotation axis of the first rotational shaft of the first actuator by forward and reverse rotations of the first rotational shaft; and a second linearly moving member which is moved forward and rearward in a direction parallel to the rotation axis of the second rotational shaft of the second actuator by forward and reverse rotations of the second rotational shaft. The first linearly moving member presses the first swing member to cause the first swing member to rotationally move, and the second linearly moving member presses the second the first swing member to cause the second linearly moving member to rotationally move.

It is desirable for the imaging device to include a first rotationally biasing member for rotationally biasing the first swing member in a direction opposite to the pressing direction of the first linearly moving member; and a second rotationally biasing member for rotationally biasing the second rotationally moving lever in a direction opposite to the pressing direction of the second linearly moving member.

It is desirable for the first and second rotational shafts of the first and second actuators to extend parallel to each other within a plane orthogonal to the common optical axis, the first actuator and the second actuator being arranged adjacent to each other in a direction perpendicular to the rotation axes of the first and second rotational shafts within the plane which is orthogonal to the common optical axis.

It is desirable for the image-stabilizing optical element to include an image sensor positioned at an imaging position of the photographing optical system.

It is desirable for the imaging device to include a third swing member, the third swing member being pivotally supported by a third rotation shaft extending parallel to the common optical axis, and wherein a forward and reverse rotational motion of the third swing member causes the image-stabilizing optical element to move between a photographing position, at which the image-stabilizing optical element is located on the common optical axis, and a radially-retracted position, at which the image-stabilizing optical element is radially retracted away from the common optical axis.

In an embodiment, an imaging device having an optical image stabilizer is provided, which detects vibration applied to a photographing optical system and moves at least one image-stabilizing optical element of the photographing optical system in a plane orthogonal to a common optical axis of the photographing optical system to counteract image shake in accordance with a direction and a magnitude of the vibration. The image stabilizer includes two swing members, each of which is rotatable about a rotation shaft parallel to the common optical axis of the photographing optical system. Forward and reverse rotation of the two swing members causes the image-stabilizing optical element to move forward and rearward in two different directions, respectively, in the plane orthogonal to the common optical axis.

The present disclosure relates to subject matter contained in Japanese Patent Application No. 2004-349184 (filed on Dec. 1, 2004), and No. 2004-370894 (filed on Dec. 22, 2004), which are expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
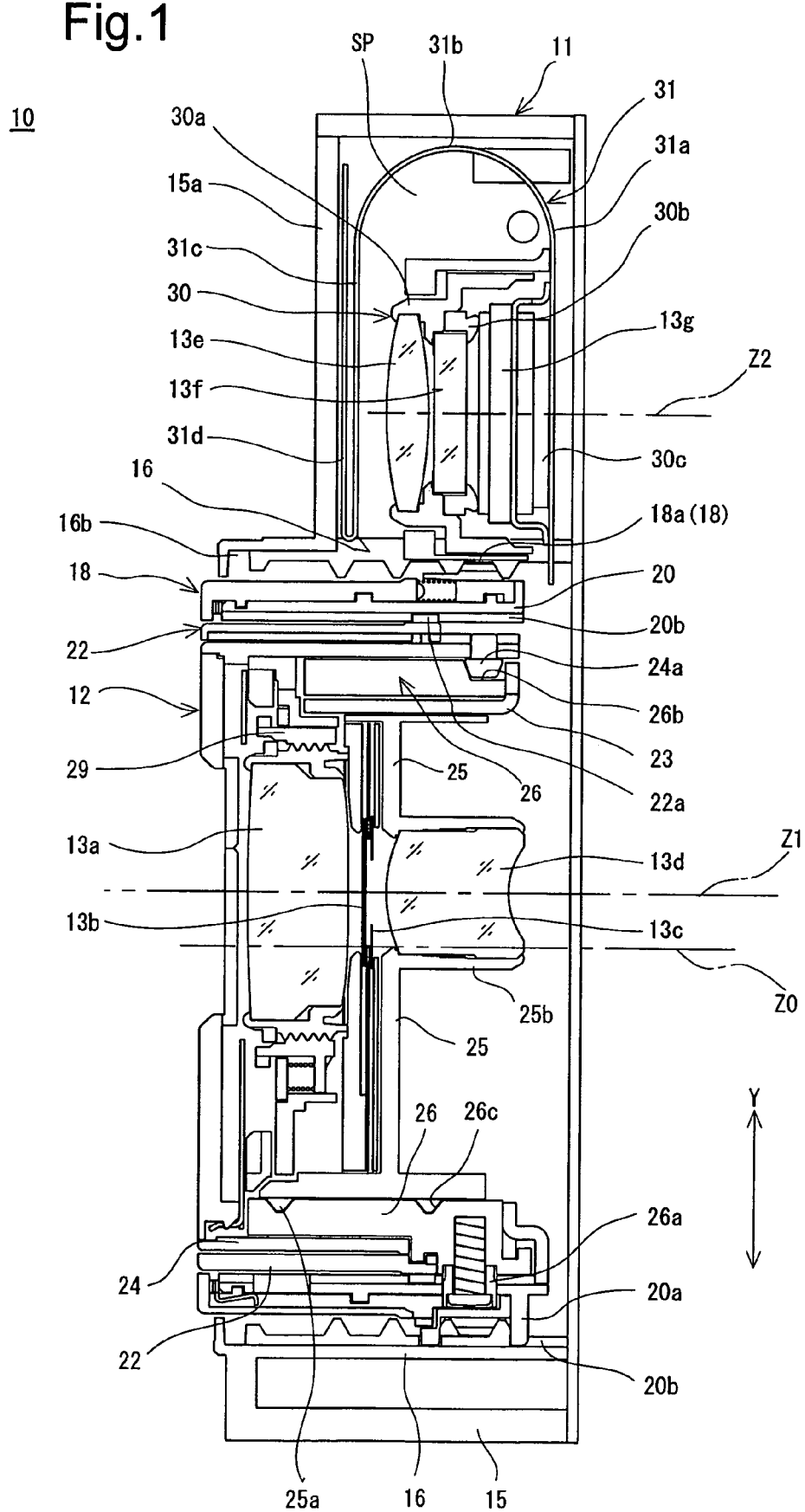
FIG. 1 is a cross-sectional view of an embodiment of a retractable zoom lens to which the present invention is applied in the retracted state of the zoom lens barrel.
Figure 2:
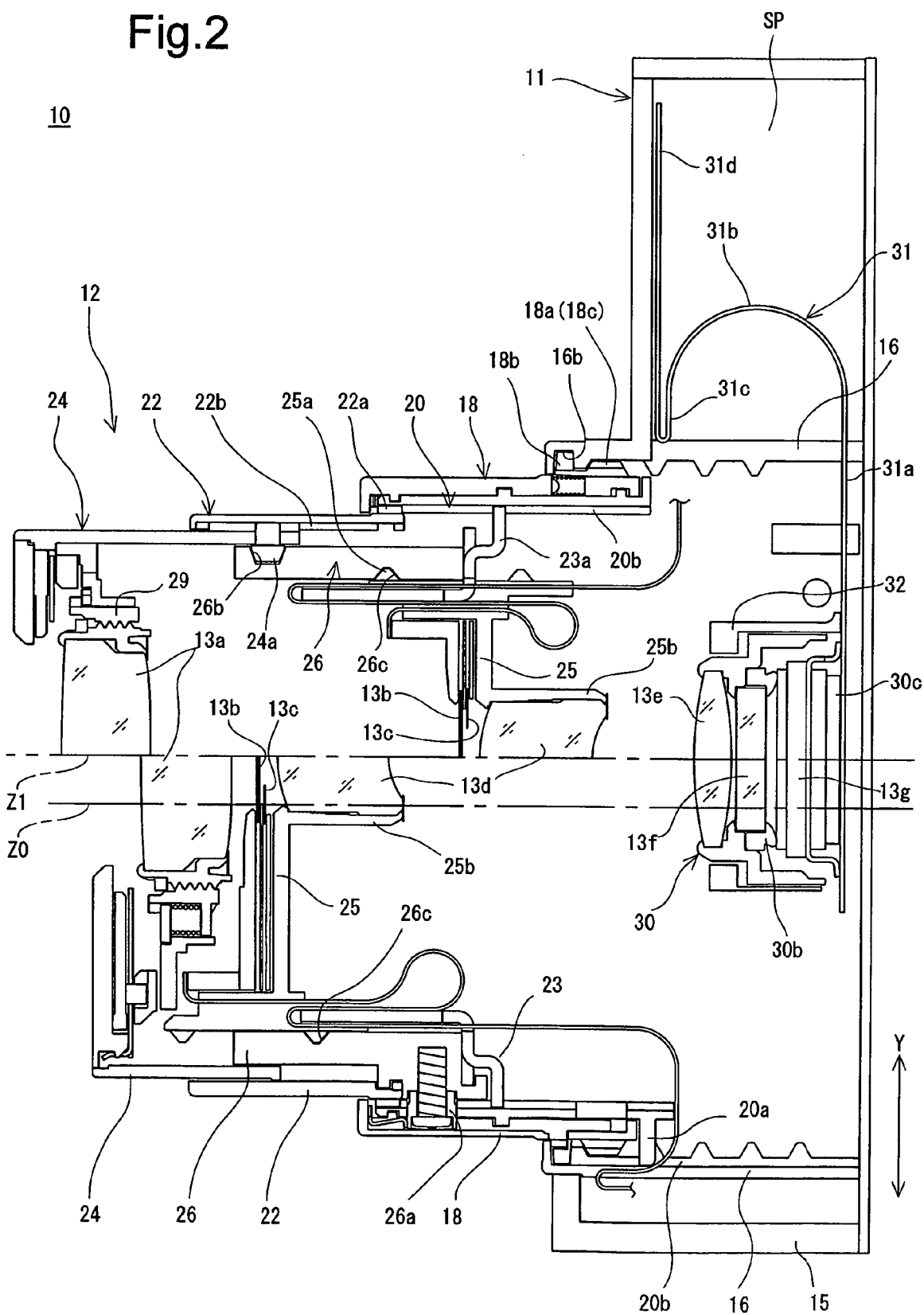
FIG. 2 is a cross-sectional view of the zoom lens shown in FIG. 1 in a photographic state of the zoom lens.
Figure 5:
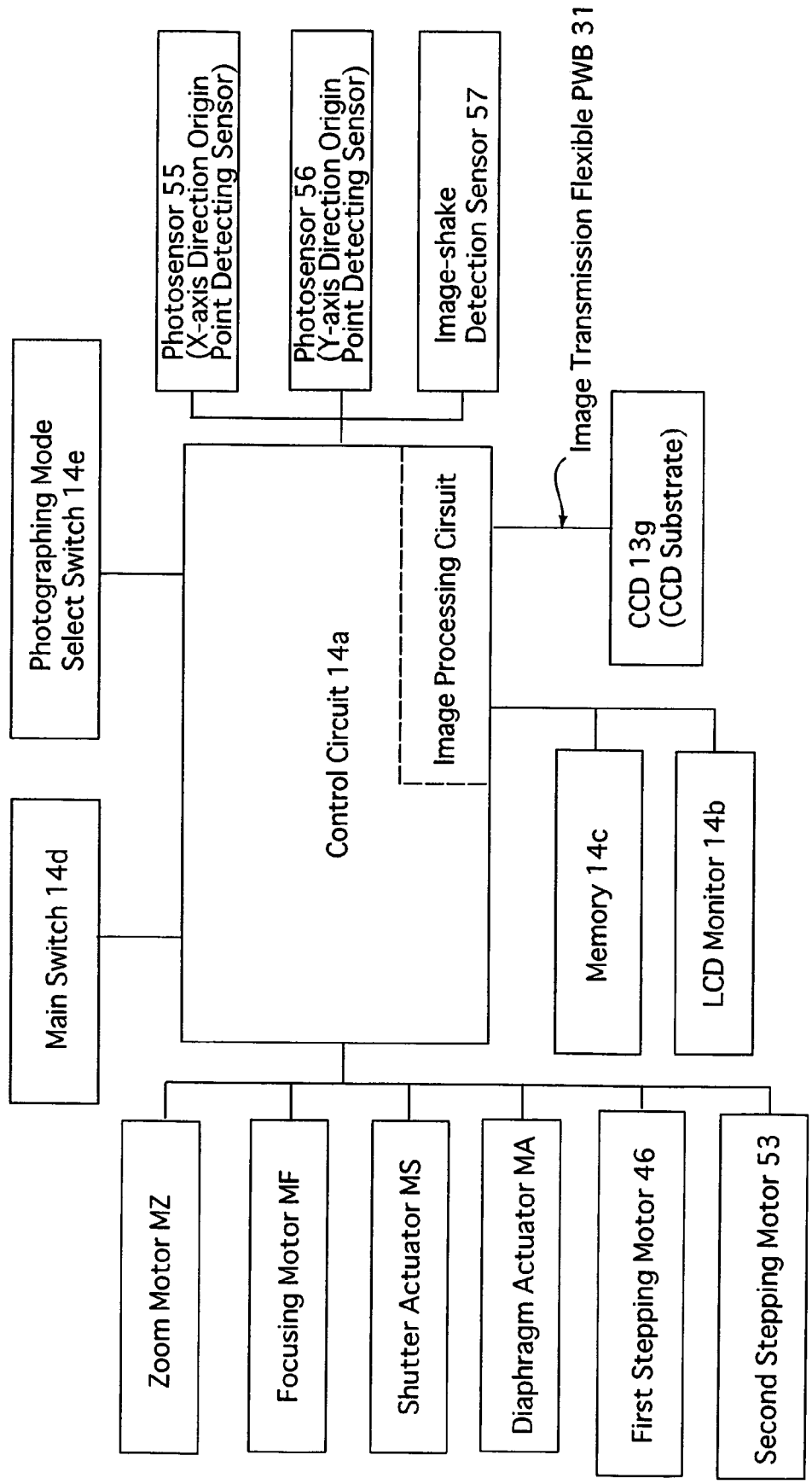
FIG. 5 is a block diagram illustrating a configuration of electrical circuits of a camera equipped with the zoom lens shown in FIGS. 1 and 2.

FIGS. 1 and 2 show cross-sections of a zoom lens 10 which is incorporated in a zoom lens camera. The zoom lens 10 is provided with a box-shaped housing 11 and a retractable barrel portion 12 retractably supported inside the housing 11. The outside of the housing 11 is covered by exterior components of the camera; the exterior components are not shown in the drawings. A photographing optical system of the zoom lens 10 includes a first lens group 13a, a shutter 13b, a diaphragm 13c, a second lens group 13d, a third lens group (image-stabilizing optical element) 13e, a low-pass filter (image-stabilizing optical element) 13f, and a CCD image sensor (image-stabilizing optical element) 13g (hereinafter referred to as CCD), in that order from the object side (the left side as viewed in FIGS. 1 and 2). As shown in FIG. 5, the CCD 13g is electrically connected to a control circuit 14a having an image processing circuit. Thus, an electronic image can be displayed on an LCD monitor 14b provided on an outer surface of the camera, and the electronic image data can be recorded in a memory 14c. In a photographic state (ready-to-photograph state) of the zoom lens 10 shown in FIG. 2, all of the optical elements constituting the photographing optical system are aligned on the same photographing optical axis (common optical axis the photographing optical system) Z1. On the other hand, in an accommodated (radially retracted) state of the zoom lens 10 shown in FIG. 1, the third lens group 13e, the low-pass filter 13f and the CCD 13g are moved away from the photographing optical axis Z1 to be radially retracted upward in the housing 11, and the second lens group 13d is linearly retracted into the space created as a result of the upward radial retracting movement of the third lens group 13e, the low-pass filter 13f and the CCD 13g, which reduces the length of the zoom lens 10 in the retracted state thereof. The overall structure of the zoom lens 10 that includes a radially-retracting mechanism for radially retracting optical elements upward will be described hereinafter. In the following description, the vertical direction and the horizontal direction of the zoom lens camera body equipped with the zoom lens 10 as viewed from the front thereof are defined as a y-axis and an x-axis, respectively.

The housing 11 is provided with a hollow box-shaped portion 15 and a hollow fixed ring portion 16 which is formed on a front wall 15a of the box-shaped portion 15 so as to enclose the photographing optical system about the photographing optical axis Z1. A rotation center axis Z0 serving as the center of the fixed ring portion 16 is parallel to the photographing optical axis Z1 and eccentrically located below the photographing optical axis Z1. A retraction space (accommodation space) SP (FIGS. 1 and 2) is formed inside the box-shaped portion 15 and above the fixed ring portion 16.

Figure 8:
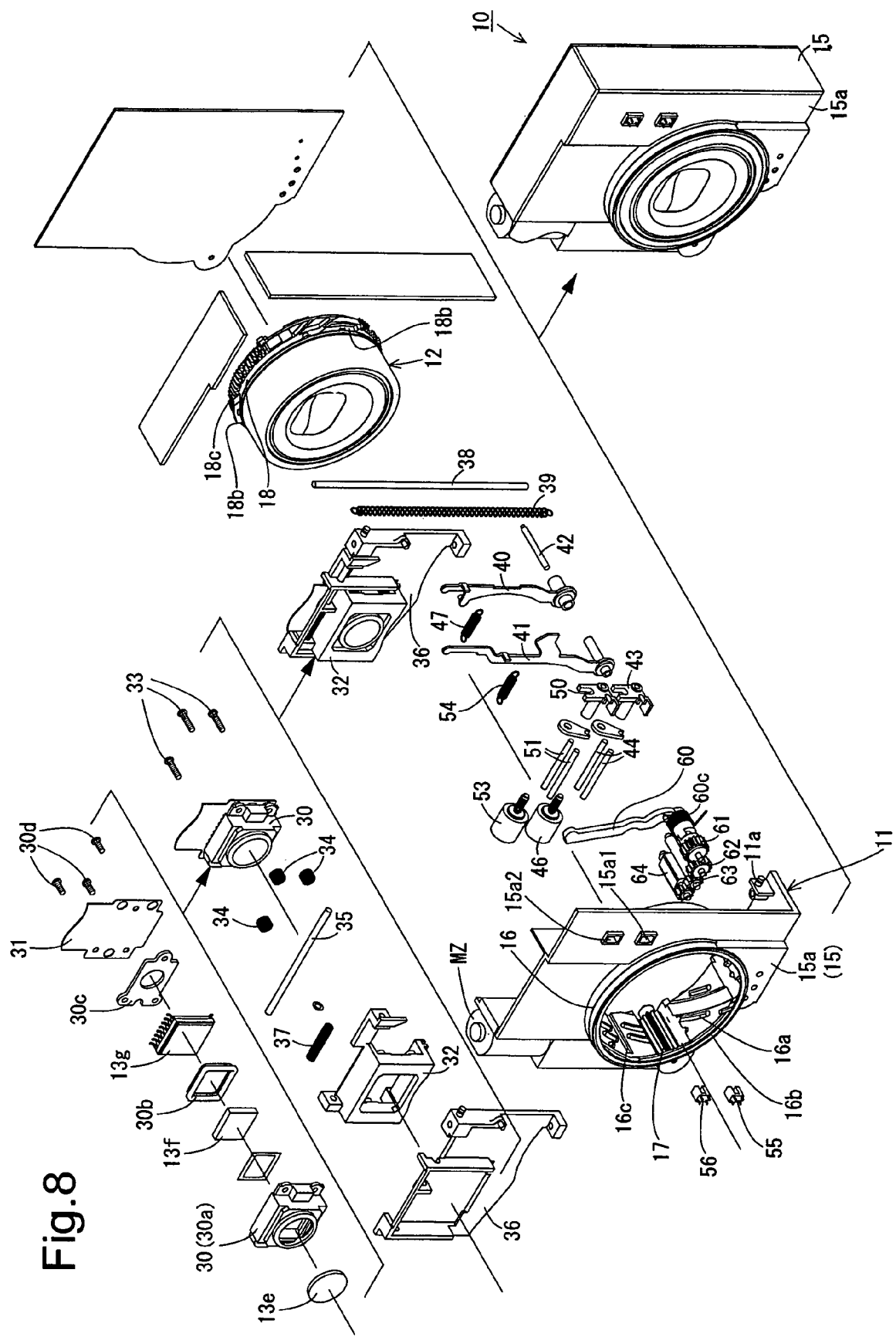
FIG. 8 is an exploded perspective view of the zoom lens shown in FIGS. 1 and 2.

A zoom gear 17 (FIGS. 8, 10 and 11) is supported on an inner peripheral surface side of the fixed ring portion 16 to be rotatable on an axis of rotation parallel to the rotation center axis Z0. The zoom gear 17 is rotated forward and reverse by a zoom motor MZ (FIGS. 5, 10, and 11) supported by the housing 11. In addition, the fixed ring portion 16 is provided on an inner peripheral surface thereof with a female helicoid 16a, a circumferential groove 16b and a plurality of linear guide grooves 16c (only one of them is shown in FIG. 8). The circumferential groove 16b is an annular groove with its center on the rotation center axis Z0, while the plurality of the linear guide grooves 16c are parallel to the rotation center axis Z0 (see FIGS. 3, 4 and 8).

Figure 10:
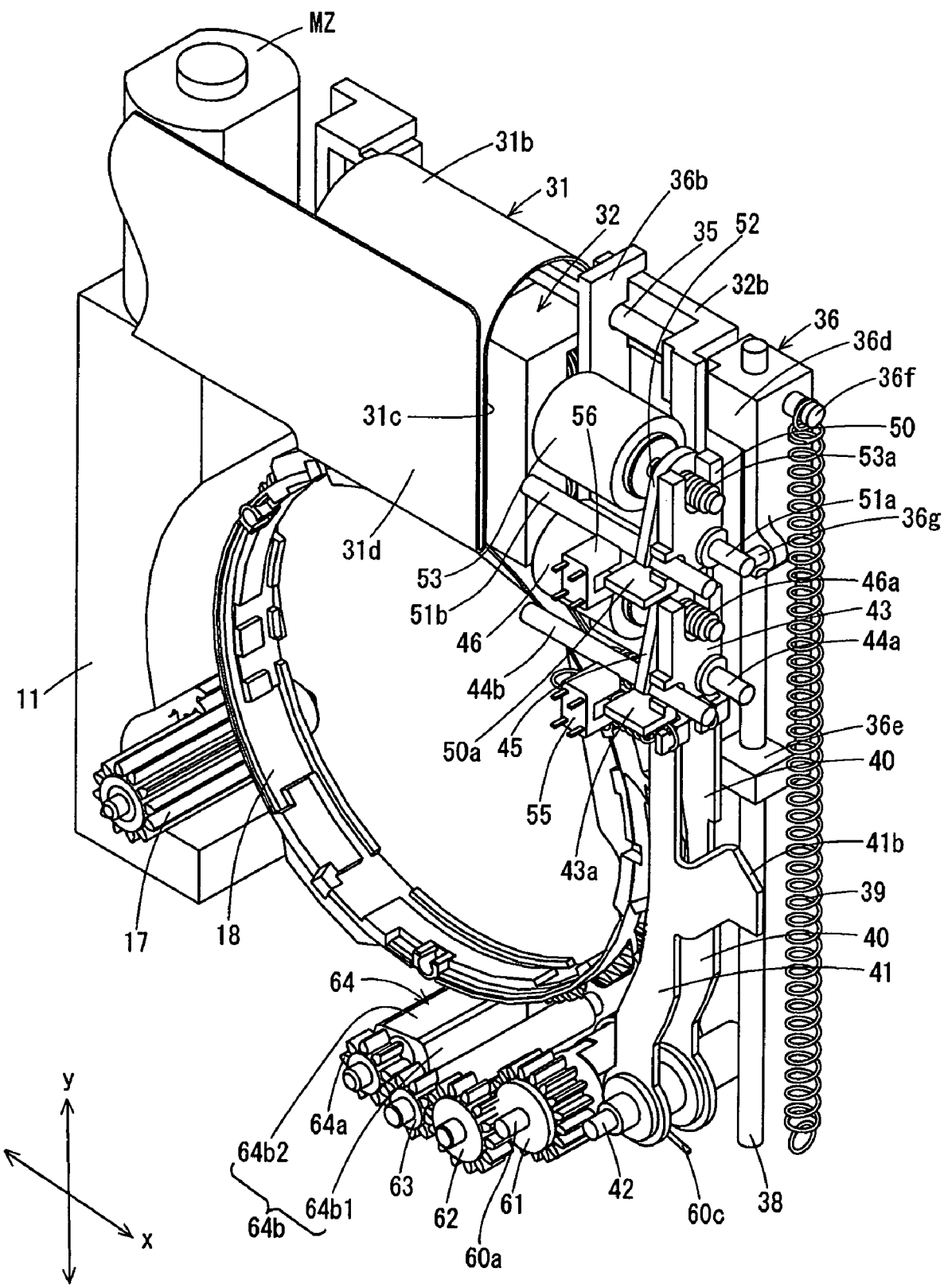
FIG. 10 is a front perspective view of the image stabilizing mechanism and the radially-retracting mechanism, illustrating the retracted state of a CCD holder in the retracted state of the zoom lens shown in FIG. 1.
Figure 11:
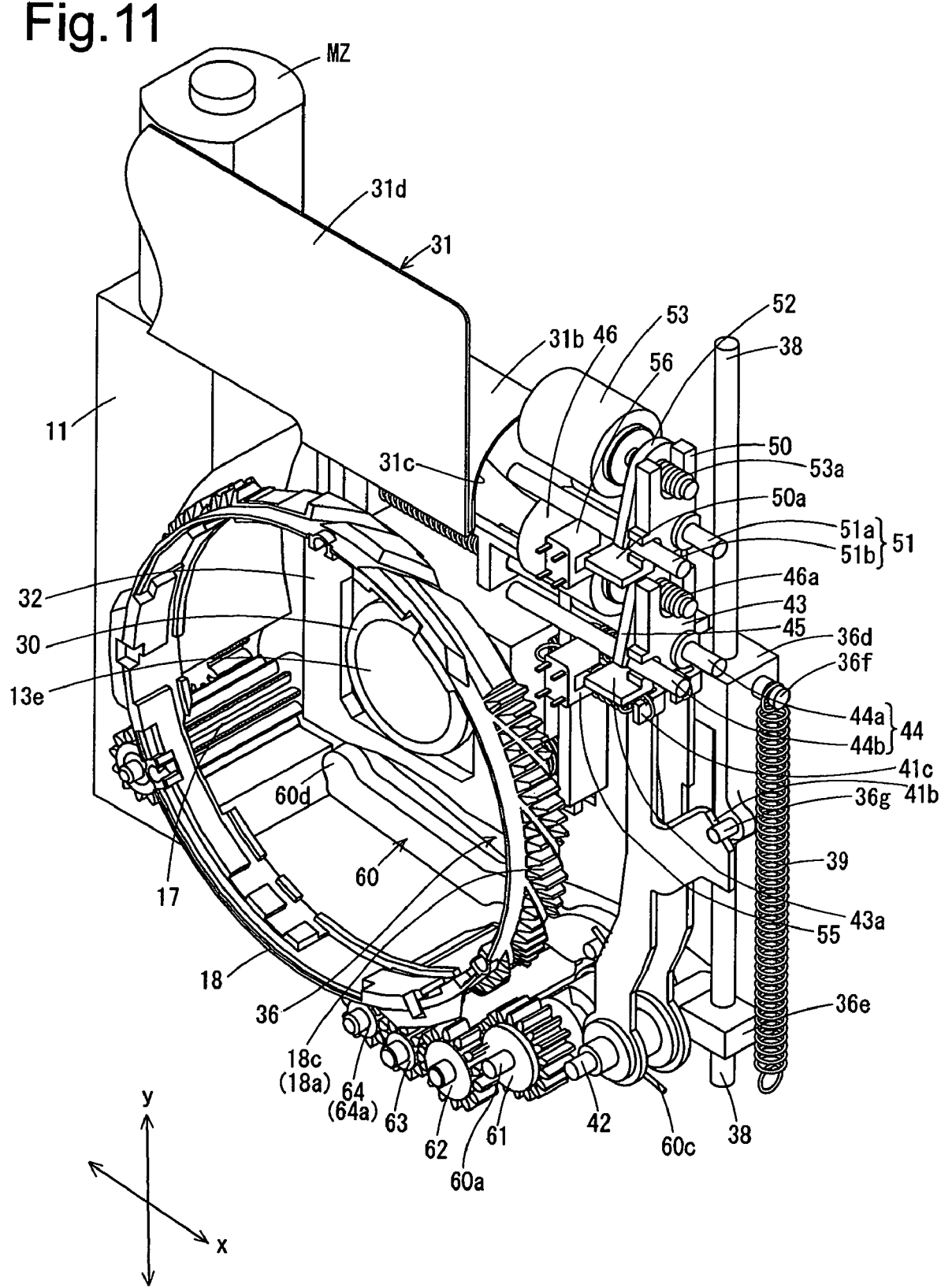
FIG. 11 is a front perspective view of the image stabilizing mechanism and the radially-retracting mechanism, illustrating the optical-axis advanced state of the CCD holder in a photographic state of the zoom lens.

A helicoid ring 18 is supported inside the fixed ring portion 16 to be rotatable about the rotation center axis Z0. The helicoid ring 18 is provided with a male helicoid 18a which is engaged with the female helicoid 16a of the fixed ring portion 16 and thus can advance and retract in the optical axis direction while rotating due to the engagement of the female helicoid 16a with the male helicoid 18a. The helicoid ring 18 is further provided, on an outer peripheral surface thereof in front of the female helicoid 18a, with a plurality of rotation guiding protrusions 18b (only two of them are shown in FIG. 8). In a state shown in FIGS. 2 through 4 in which the helicoid ring 18 advances to the frontmost position thereof with respect to the fixed ring portion 16, the female helicoid 16a and the male helicoid 18a are disengaged from each other while the plurality of rotation guiding protrusions 18b are slidably fitted in the circumferential groove 16b so that the helicoid ring 18 is prevented from further moving in the optical axis direction and is allowed only to rotate at a fixed position in the optical axis direction. The helicoid ring 18 is further provided on threads of the male helicoid 18a with an annular spur gear 18c which is in mesh with the zoom gear 17. Teeth of the spur gear 18c are aligned parallel to the photographing optical axis Z1. The zoom gear 17 is elongated in the axial direction thereof so as to remain engaged with the spur gear 18c at all times over the entire range of movement of the helicoid ring 18 from a retracted state of the helicoid ring 18 shown in FIGS. 1 and 10 to an extended state of the helicoid ring 18 shown in FIGS. 2 and 11. The helicoid ring 18 is constructed by combining two ring members which are splittable in the optical axis direction. In FIGS. 10 and 11, only the rear ring member of the helicoid ring 18 is shown.

Figure 3:
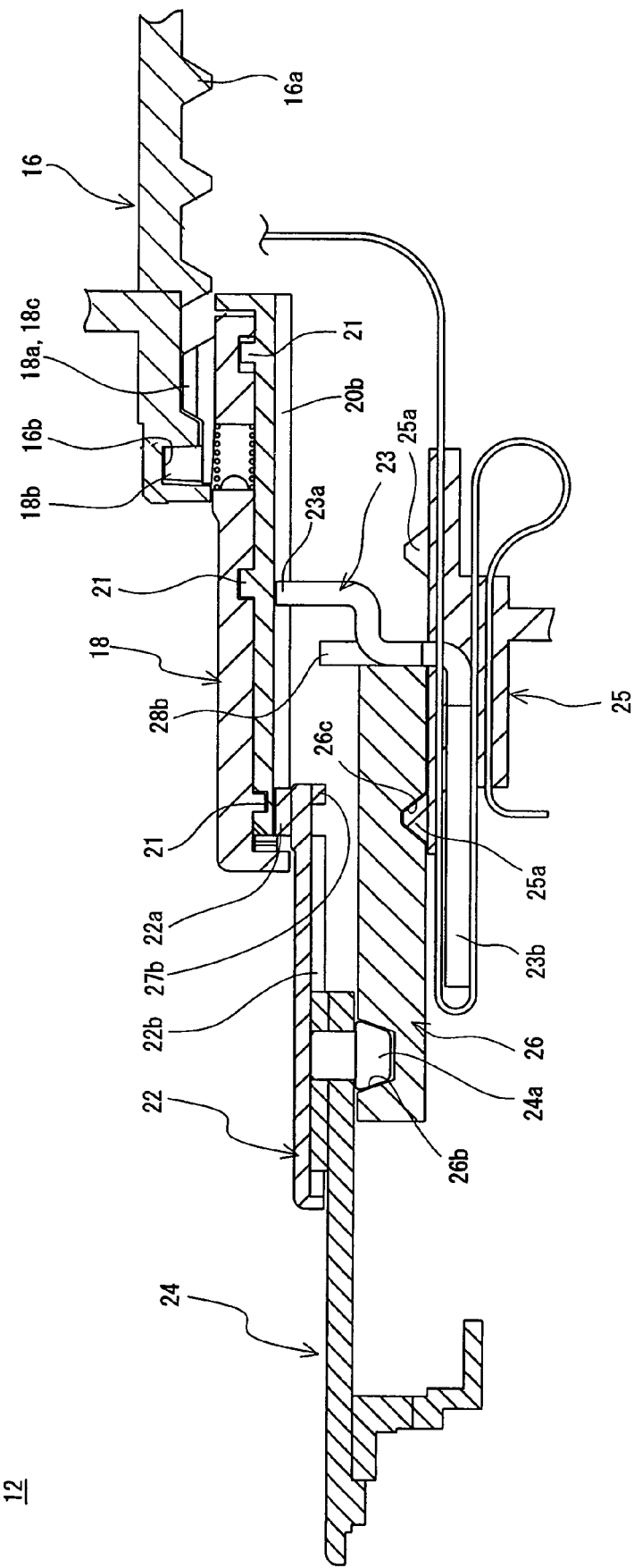
FIG. 3 is an enlarged cross-sectional view of a part of the zoom lens at the wide-angle extremity thereof.
Figure 4:
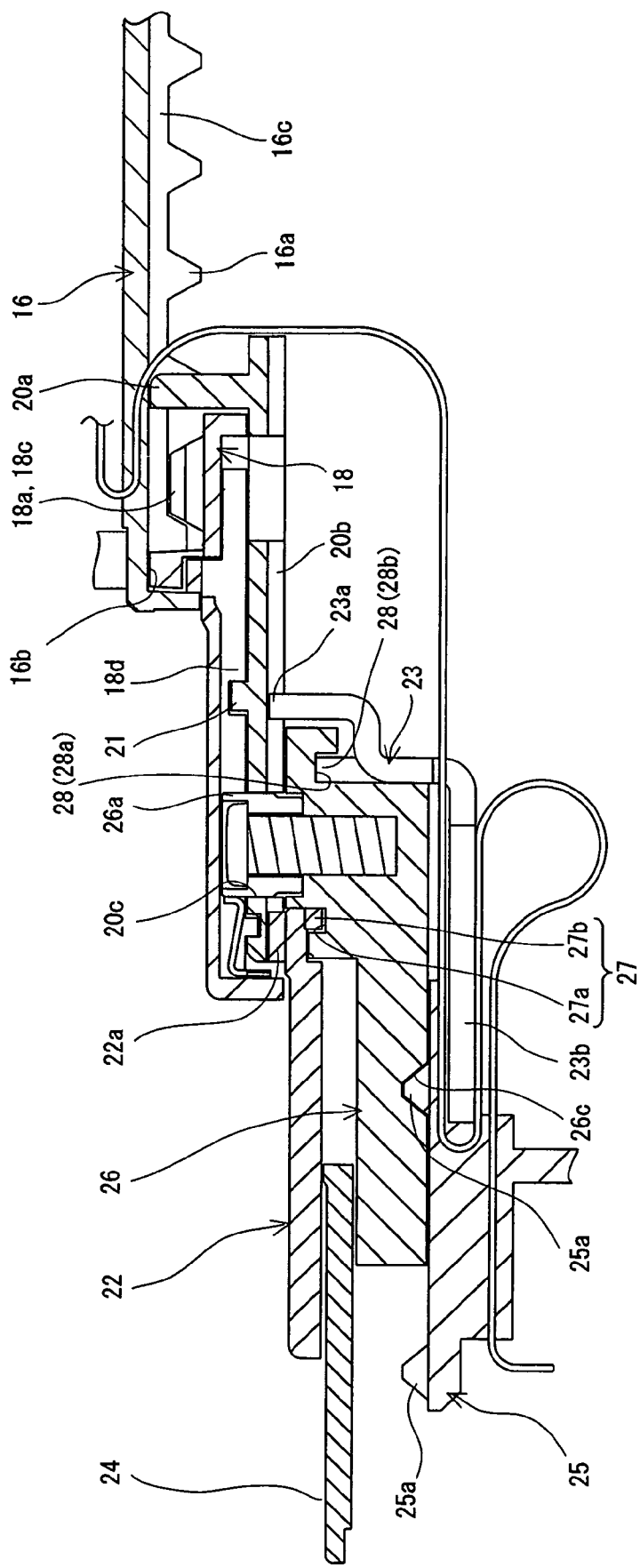
FIG. 4 is an enlarged cross-sectional view of a part of the zoom lens at the telephoto extremity thereof.

A linear guide ring 20 is supported inside the helicoid ring 18. The linear guide ring 20 is provided in the vicinity of the rear end thereof with a linear guide projection 20a, and is guided linearly along the rotation center axis Z0 (and the photographing optical axis Z1) by the slidable engagement of the linear guide projection 20a with the linear guide groove 16c of the fixed ring portion 16 as shown in FIG. 4. A rotation guiding portion 21 is provided between the inner peripheral surface of the helicoid ring 18 and the outer peripheral surface of the linear guide ring 20. The helicoid ring 18 is supported by the linear guide ring 20 to be rotatable with respect to the linear guide ring 20 and to be movable together with the linear guide ring 20 in the optical axis direction via the rotation guiding portion 21. The rotation guiding portion 21 consists of a plurality of circumferential grooves provided at different positions in the axial direction and radial protrusions, each of which is slidably engaged in the corresponding circumferential groove (see FIGS. 3 and 4).

The linear guide ring 20 is provided on an inner peripheral surface thereof with a plurality of linear guide grooves 20b (only one of them is shown in each of FIGS. 1 through 4) which extend parallel to the rotation center axis Z0 (and the photographing optical axis Z1). A plurality of linear guide projections 22a (only one of them is shown in each of FIGS. 1 through 4) which project radially outwards from a first lens group linear guide ring 22 and a plurality of linear guide projections 23a (only one of them is shown in each of FIGS. 1 through 4) which project radially outwards from a second lens group linear guide ring 23 are slidably engaged with the plurality of linear guide grooves 20b, respectively. The first lens group linear guide ring 22 guides a first lens group support frame 24 linearly in a direction parallel to the rotation center axis Z0 (and the photographing optical axis Z1) via a plurality of linear guide grooves 22b (only one of them is shown in each of FIGS. 2 and 3) formed on an inner peripheral surface of the first lens group linear guide ring 22. The second lens group linear guide ring 23 guides a second lens group support frame 25 linearly in a direction parallel to the rotation center axis Z0 (and the photographing optical axis Z1) via a plurality of linear guide keys 23b (only one of them is shown in each of FIGS. 1 through 4). The first lens group support frame 24 supports the first lens group 13a via a focusing frame 29, and the second lens group support frame 25 supports the second lens group 13d.

A cam ring 26 is provided inside the linear guide ring 20 to be rotatable about the rotation center axis Z0. The cam ring 26 is supported by the first lens group linear guide ring 22 and the second lens group linear guide ring 23 to be rotatable with respect to each of the first lens group linear guide ring 22 and the second lens group linear guide ring 23 and to movable in the optical axis direction together therewith via rotation guiding portions 27 and 28 (see FIG. 4). As shown in FIGS. 3 and 4, the rotation guiding portion 27 is composed of a discontinuous circumferential groove 27a (not shown in FIG. 3) which is formed on an outer peripheral surface of the cam ring 26, and an inner flange 27b which projects radially inwards from the first lens group linear guide ring 22 to be slidably engaged in the discontinuous circumferential groove 27a. As shown in FIGS. 3 and 4, the rotation guiding portion 28 is composed of a discontinuous circumferential groove 28a (not shown in FIG. 3) formed on an inner peripheral surface of the cam ring 26 and an outer flange 28b which projects radially outwards from the second lens group linear guide ring 23 to be slidably engaged in the discontinuous circumferential groove 28a.

As shown in FIG. 4, the cam ring 26 is provided thereon with a plurality of follower protrusions 26a (only one of them is shown in FIG. 4) which project radially outwards. The plurality of follower protrusions 26a passes through a plurality of follower guide slots 20c (only one of them is shown in FIG. 4) formed in the linear guide ring 20 to be engaged in a plurality of rotation transfer grooves 18*d* (only one of them is shown in FIG. 4) formed on an inner peripheral surface of the helicoid ring 18. Each rotation transfer groove 18*d* is parallel to the rotation center axis Z0 (and the photographing optical axis Z1), and each follower protrusion 26*a* is slidably engaged in the associated rotation transfer groove 18*d* to be prevented from moving in the circumferential direction relative to the associated rotation transfer groove 18*d*. Accordingly, the rotation of the helicoid ring 18 is transferred to the cam ring 26 via the engagement between the plurality of rotation transfer grooves 18*d* and the plurality of follower protrusions 26*a*. Although the development shape of each follower guide groove 20*c* is not shown in the drawings, each follower guide groove 20*c* is a guide groove including a circumferential groove portion with its center on the rotation center axis Z0 and an inclined lead groove portion parallel to the female helicoid 16*a*. Accordingly, when rotated by a rotation of the helicoid ring 18, the cam ring 26 rotates while moving forward or rearward along the rotation center axis Z0 (and the photographing optical axis Z1) if each follower protrusion 26*a* is engaged in the lead groove portion of the associated follower guide groove 20*c*, and rotates at a fixed position in the optical axis direction without moving forward or rearward if each follower protrusion 26*a* is engaged in the circumferential groove portion of the associated follower guide groove 20*c*.

The cam ring 26 is a double-sided cam ring having a plurality of outer cam grooves 26*b* (only one of them is shown in FIG. 3) and a plurality of inner cam grooves 26*c* (only one of them is shown in each of FIGS. 3 and 4) on outer and inner peripheral surfaces of the cam ring 26, respectively. The plurality of outer cam grooves 26*b* are slidably engaged with a plurality of cam followers 24*a* (only one of them is shown in FIG. 3) which project radially inwards from the first lens group support frame 24, respectively, while the plurality of inner cam grooves 26*c* are slidably engaged with a plurality of cam followers 25*a* (only one of them is shown in each of FIGS. 3 and 4) which project radially outwards from the second lens group support frame 25. Accordingly, when the cam ring 26 is rotated, the first lens group support frame 24 that is guided linearly in the optical axis direction by the first lens group linear guide ring 22 moves forward and rearward along the rotation center axis Z0 (and the photographing optical axis Z1) in predetermined motion in accordance with contours of the plurality of outer cam grooves 26*b*. likewise, when the cam ring 26 is rotated, the second lens group support frame 25 that is guided linearly in the optical axis direction by the second lens group linear guide ring 23 moves forward and rearward along the rotation center axis Z0 (and the photographing optical axis Z1) in predetermined motion in accordance with contours of the plurality of the plurality of inner cam grooves 26*c*.

The second lens group support frame 25 is provided with a cylindrical portion 25*b* (see FIGS. 1 and 2) which holds the second lens group 13*d*, and supports the shutter 13*b* and the diaphragm 13*c* in front of the cylindrical portion 25*b* to allow each of the shutter 13*b* and the diaphragm 13*c* to be opened and closed. The shutter 13*b* and the diaphragm 13*c* can be opened and closed by a shutter actuator MS and a diaphragm actuator MA, respectively, which are supported by the second lens group support frame 25 (see FIGS. 5 and 15).

The focusing frame 29 which holds the first lens group 13*a* is supported by the first lens group support frame 24 to be movable along the rotation center axis Z0 (and the photographing optical axis Z1). The focusing frame 29 can be moved forward and rearward by a focusing motor MF (see FIG. 5).

The operation of each of the zoom motor MZ, the shutter actuator MS, the diaphragm actuator MA and the focusing motor MF is controlled by the control circuit 14*a*. Upon turning on a main switch 14*d* (see FIG. 5) of the camera, the zoom motor MZ is driven to bring the zoom lens 10 to the photographic state shown in FIG. 2. Upon turning off the main switch 14*d*, the zoom lens 10 is moved from the photographic state to the retracted state shown in FIG. 1.

The above described operation of the zoom lens 10 is summarized as follows. Upon turning on the main switch 14*d* in the retracted state of the zoom lens 10 shown in FIG. 1, the zoom gear 17 is driven to rotate in a lens barrel advancing direction. Accordingly, the helicoid ring 18 moves forward in the optical axis direction while rotating, and simultaneously, the linear guide ring 20 linearly moves forward in the optical axis direction together with the helicoid ring 18. In addition, the rotation of the helicoid ring 18 causes the cam ring 26 to move forward in the optical axis direction while rotating relative to the linear guide ring 20. The first lens group linear guide ring 22 and the second lens group linear guide ring 23 linearly move forward in the optical axis direction together with the cam ring 26. Each of the first lens group support frame 24 and the second lens group support frame 25 moves in the optical axis direction relative to the cam ring 26 in predetermined motion. Therefore, the moving amount of the first lens group 13*a* in the optical axis direction when the zoom lens 10 is extended from the retracted state thereof is determined by adding the moving amount of the cam ring 26 relative to the fixed ring portion 16 to the moving amount of the first lens group support frame 24 relative to the cam ring 26 (the advancing/retracting amount of the first lens group support frame 24 by the cam groove 26*b*). Furthermore, the moving amount of the second lens group 13*d* in the optical axis direction when the zoom lens 10 is extended from the retracted state thereof is determined by adding the moving amount of the cam ring 26 relative to the fixed ring portion 16 to the moving amount of the second lens group support frame 25 relative to the cam ring 26 (the advancing/retracting amount of the second lens group support frame 25 by the cam groove 26*c*).

Figure 6:
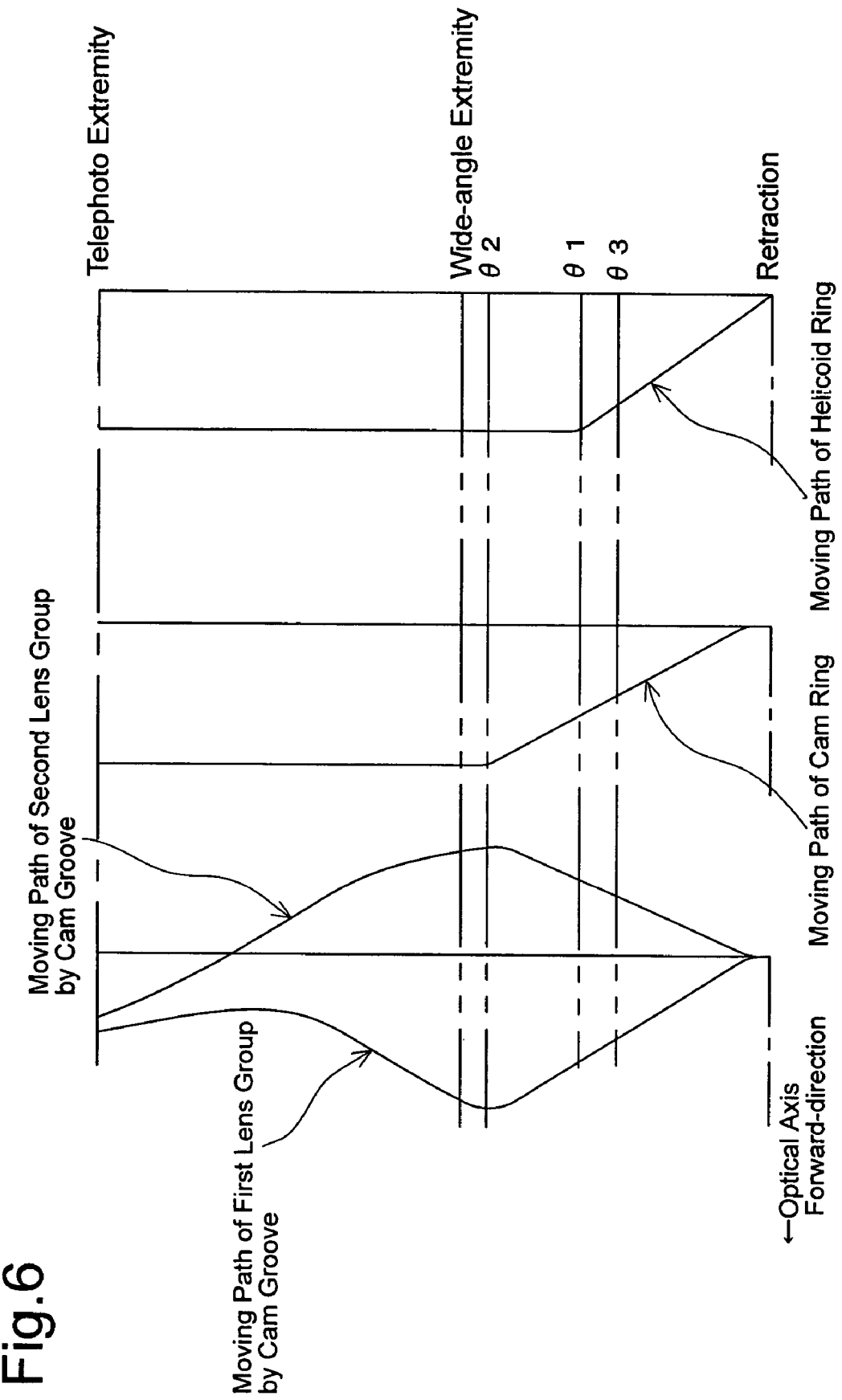
FIG. 6 is a conceptual diagram showing the moving paths of a helicoid ring and a cam ring and the moving paths of a first lens group and a second lens group by movement of the cam ring.
Figure 7:
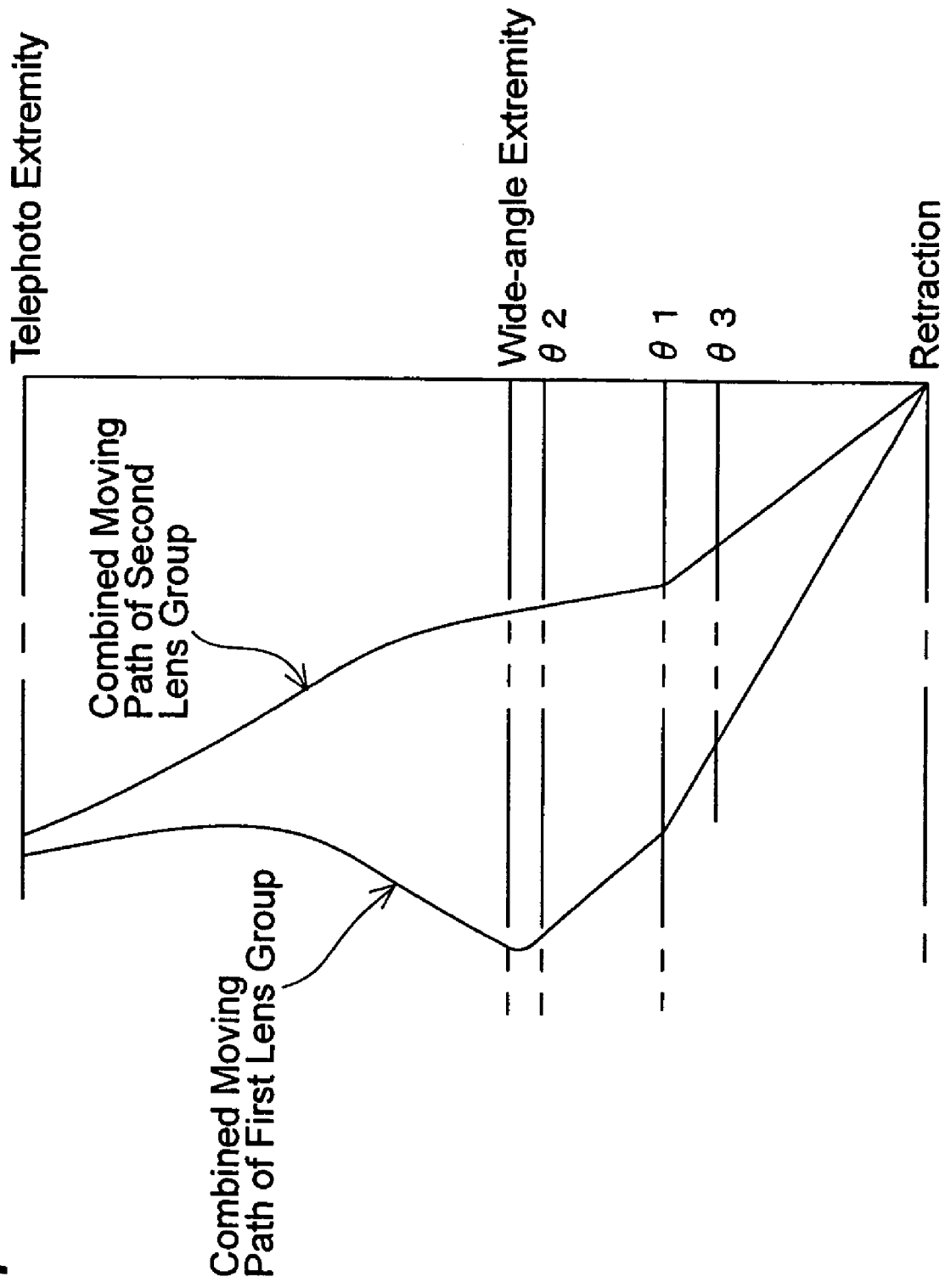
FIG. 7 is a conceptual diagram showing the combined moving path of each of the first lens group and the second lens group, in which the moving paths of the helicoid ring and the cam ring are included.

FIG. 6 shows the moving paths of the helicoid ring 18 and the cam ring 26 and the moving paths of the first lens group 13*a* and the second lens group 13*d* relative to the cam ring 26 (the cam diagrams of the cam grooves 26*b* and 26*c*). The vertical axis represents the amount of rotation (angular position) of the lens barrel from the retracted state of the zoom lens 10 to the telephoto extremity thereof, and the horizontal axis represents the amount of movement of the lens barrel in the optical axis direction. As shown in FIG. 6, the helicoid ring 18 is moved forward in the optical axis direction while rotating up to an angular position θ1 which is located at about the midpoint in the range of extension of the zoom lens 10 from the retracted position (shown in FIG. 1) to the wide-angle extremity (shown by the upper half of the zoom lens 10 from the photographing optical axis Z1 and shown in FIG. 2), whereas the helicoid ring 18 rotates at a fixed position in the optical axis direction as described above in the range of extension of the zoom lens 10 from the angular position θ1 to the telephoto extremity (shown by the lower half of the zoom lens 10 from the photographing optical axis Z1 and shown in FIG. 4). On the other hand, the cam ring 26 is moved forward in the optical axis direction while rotating up to an angular position θ2 which is located immediately behind the wide-angle extremity of the zoom lens 10 in the range of extension of the zoom lens 10 from the retracted position to the wide-angle extremity, whereas the cam ring 26 rotates at a fixed position in the optical axis direction as described above in the range of extension of the zoom lens 10 from the angular position θ2 to the telephoto extremity, similar to the helicoid ring 18. In the zooming range from the wide-angle extremity to the telephoto-extremity, the moving amount of the first lens group 13a in the optical axis direction is determined from the moving amount of the first lens group support frame 24 relative to the cam ring 26 which rotates at a fixed position in the optical axis direction (the advancing/retracting amount of the first lens group support frame 24 via the cam groove 26b), while the moving amount of the second lens group 13d in the optical axis direction is determined from the moving amount of the second lens group support frame 25 relative to the cam ring 26 which rotates at a fixed position in the optical axis direction (the advancing/retracting amount of the second lens group support frame 25 via the cam groove 26c). The focal length of the zoom lens 10 is varied by the relative movement in the optical axis direction between the first lens group 13a and the second lens group 13d. FIG. 7 shows the actual moving path of the first lens group 13a which is obtained by combining the moving amounts of the helicoid ring 18 and the cam ring 26 with the moving amount of the first lens group 13a by the cam groove 26b, and the actual moving path of the second lens group 13d which is obtained by combining the moving amounts of the helicoid ring 18 and the cam ring 26 with the moving amount by the cam groove 26c.

In the zooming range from the wide-angle extremity to the telephoto extremity, a focusing operation is performed by moving the first lens group 13a in the optical axis direction independently of other optical elements by the focusing motor MF.

The operations of the first lens group 13a and the second lens group 13d have been described above. In the zoom lens 10 of the present embodiment, the optical elements of the zoom lens 10 from the third lens group 13e to the CCD 13g are retractable away from the photographing position on the photographing optical axis Z1 to an off-optical-axis retracted position (radially retracted position) Z2 located above the photographing position as described above. In addition, by moving the optical elements from the third lens group 13e to the CCD 13g on a plane perpendicular to the photographing optical axis Z1, image shake can also be counteracted. The retracting mechanism and the image stabilizing mechanism will be discussed hereinafter.

Figure 18:
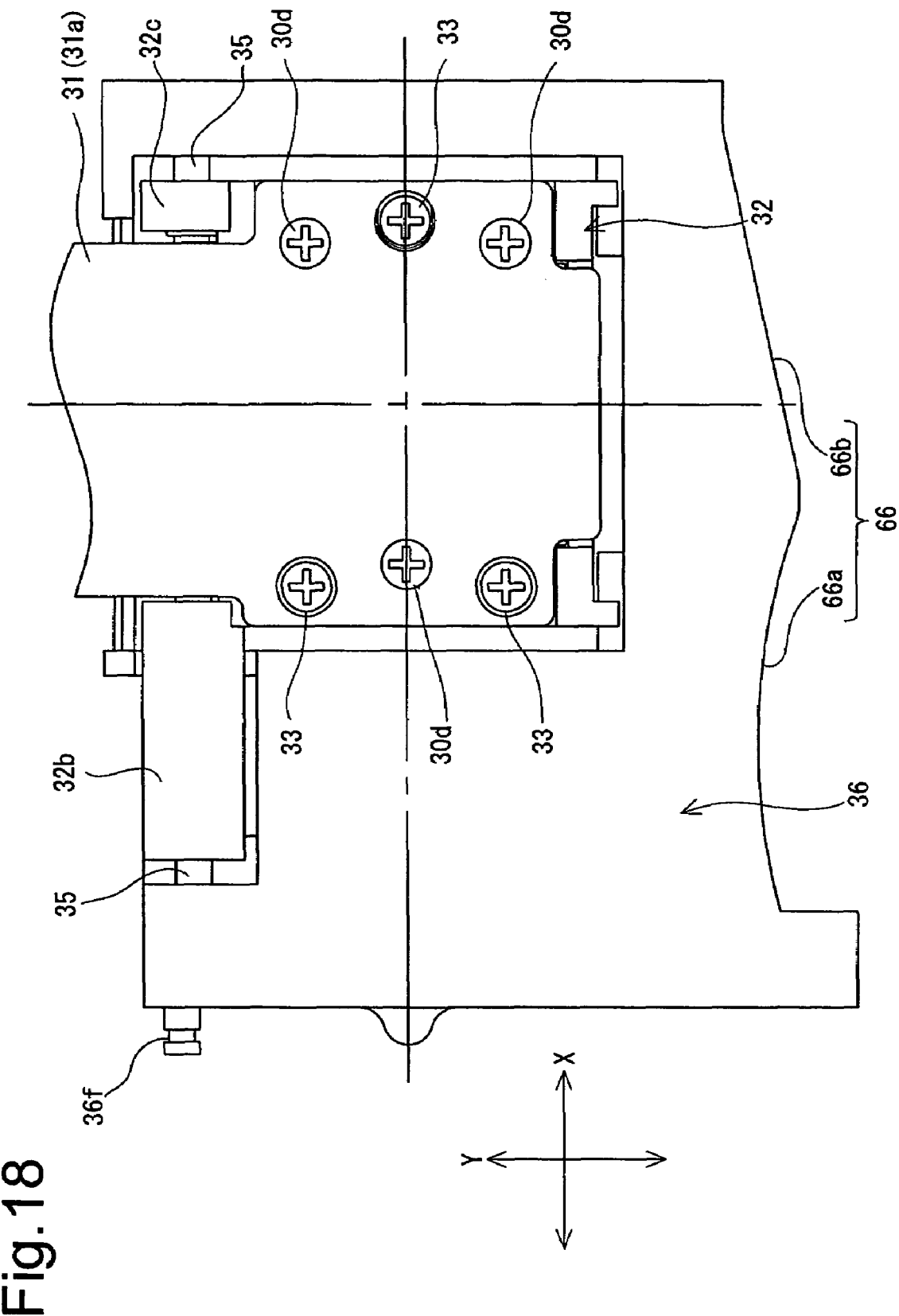
FIG. 18 is a rear view of the horizontal moving frame, the vertical moving frame and the associated elements shown in FIGS. 16 and 17.
Figure 19:
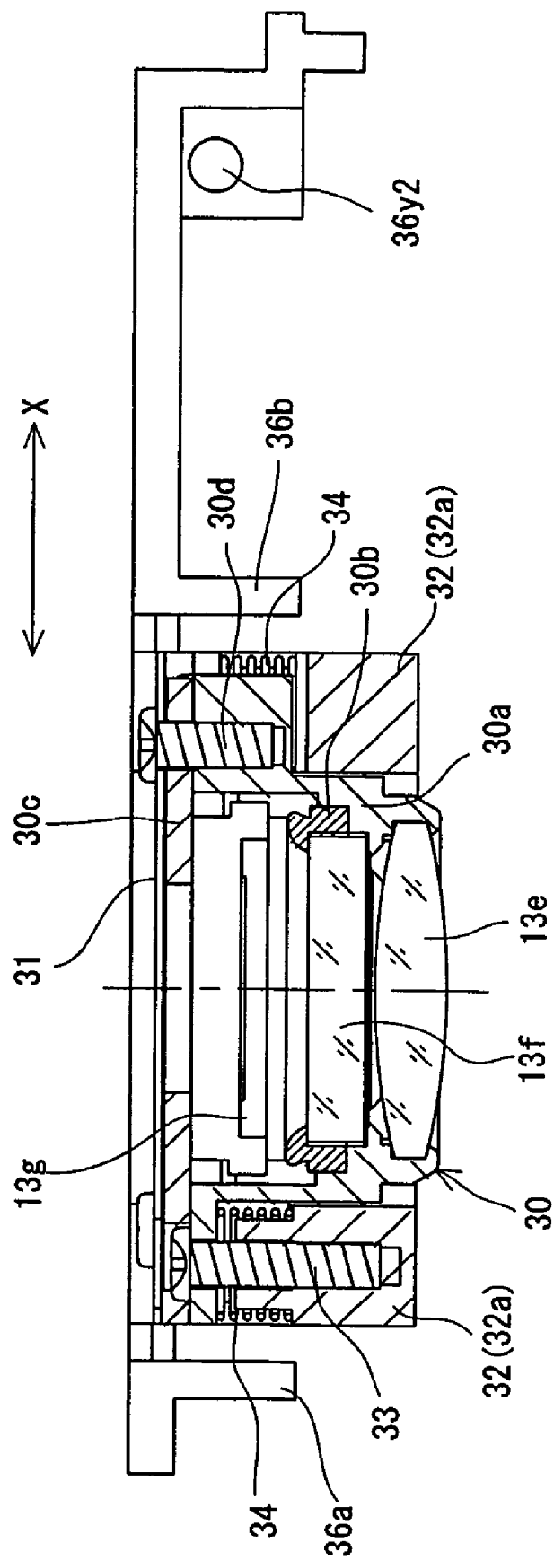
FIG. 19 is a cross-sectional view of the CCD holder, the horizontal moving frame, the vertical moving frame and other elements, taken along D1-D1 line shown in FIG. 17.

As shown in FIGS. 8 and 19, the third lens group 13e, the low-pass filter 13f and the CCD 13g are held by a CCD holder 30 to be provided as a unit. The CCD holder 30 is provided with a holder body 30a, a sealing member 30b and a pressure plate 30c. The third lens group 13e is held by the holder body 30a at a front end aperture thereof. The low-pass filter 13f is held between a flange formed on an inner surface of the holder body 30a and the sealing member 30b, and the CCD 13g is held between the sealing member 30b and the pressure plate 30c. The holder body 30a and the pressure plate 30c are fixed to each other by three fixing screws 30d (see FIGS. 15 and 18) separately arranged around the central axis of the CCD holder 30 (the photographing optical axis Z1 in a photographic state of the zoom lens 10). The three fixing screws 30d also secure one end portion of an image transmission flexible PWB 31 to the rear surface of the pressure plate 30c so that a supporting substrate of the CCD 13g is electrically connected to the image transmission flexible PWB 31.

The image transmission flexible PWB 31 extends from its connection end at the CCD 13g to the retraction space SP in the housing 11. The image transmission flexible PWB 31 is provided with a first linear portion 31a, a U-shaped portion 31b, a second linear portion 31c, and a third linear portion 31d (see FIGS. 1 and 2). The first linear portion 31a is substantially orthogonal to the photographing optical axis Z1 and extends upward. The U-shaped portion 31b is bent forward from the first linear portion 31a. The second linear portion 31c extends downward from the U-shaped portion 31b. The third linear portion 31d is folded upward from the second linear portion 31c. The third linear portion 31d is fixed to an inner surface of the front wall 15a of the housing 11 therealong. The first linear portion 31a, the U-shaped portion 31b and the second linear portion 31c (except the third linear portion 31d) serve as a free-deformable portion which is freely resiliently deformable according to the motion of the CCD holder 30.

The CCD holder 30 is supported by a horizontal moving frame (movable frame) 32 via three adjusting screws 33 (see FIGS. 15 and 18) separately arranged around the central axis of the CCD holder 30 (the photographing optical axis Z1 in a ready-photograph state of the zoom lens 10). Three compression coil springs 34 are installed between the CCD holder 30 and the horizontal moving frame 32. The shaft portions of the three adjusting screws 33 are inserted into the three compression coil springs 34, respectively. When the tightening amounts of the adjusting screws 33 are changed, the respective compression amounts of the coil springs 34 are changed. The adjusting screws 33 and the compression coil springs 34 are provided at three different positions around the optical axis of the third lens group 13e, and accordingly, the inclination of the CCD holder 30 with respect to the horizontal moving frame 32, or the inclination of the optical axis of the third lens group 13e with respect to the photographing optical axis Z1, can be adjusted by changing the tightening amounts of the three adjusting screws 33.

Figure 16:
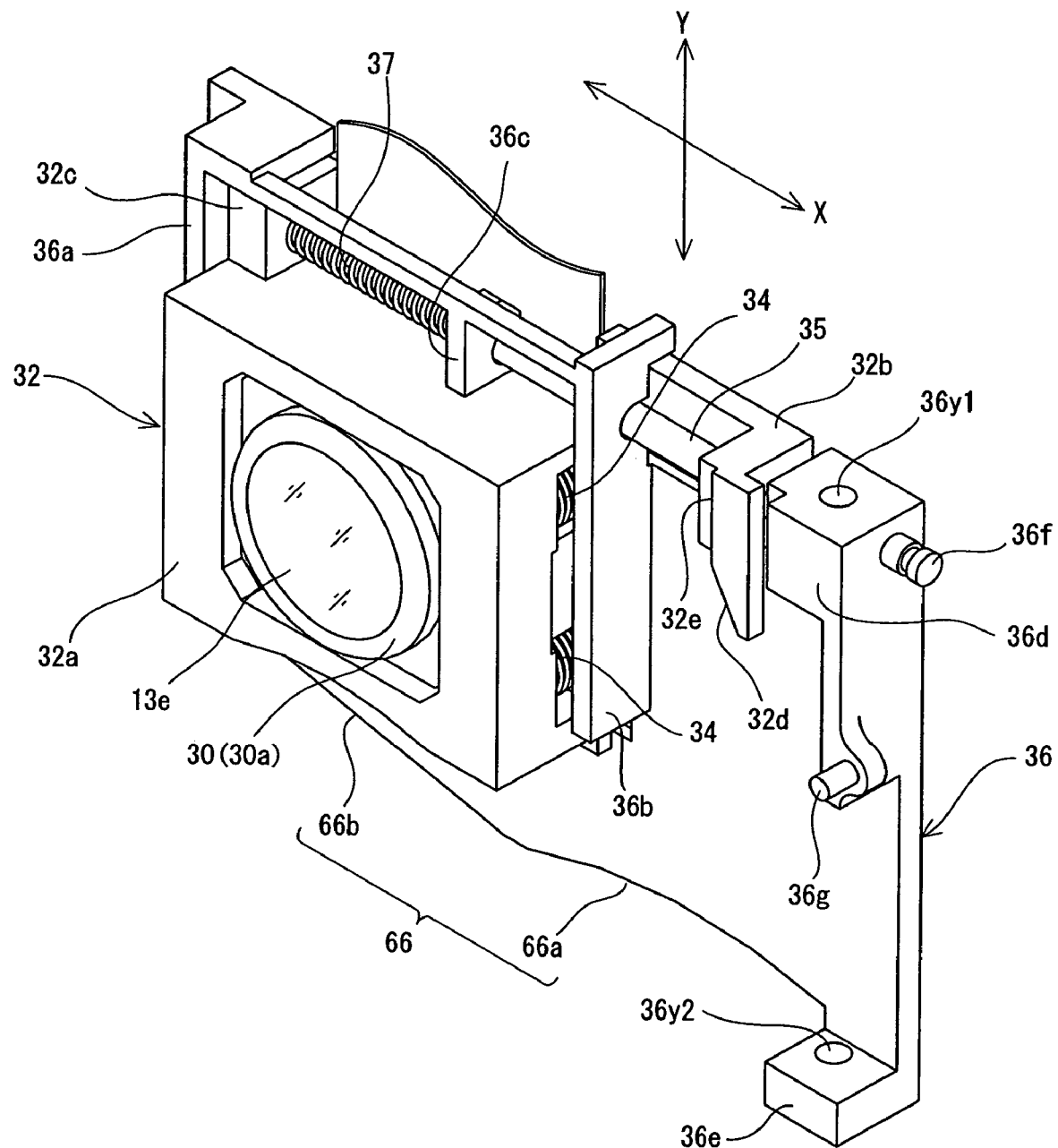
FIG. 16 is a front perspective view of a horizontal moving frame and a vertical moving frame which support the CCD holder, and associated elements.
Figure 17:
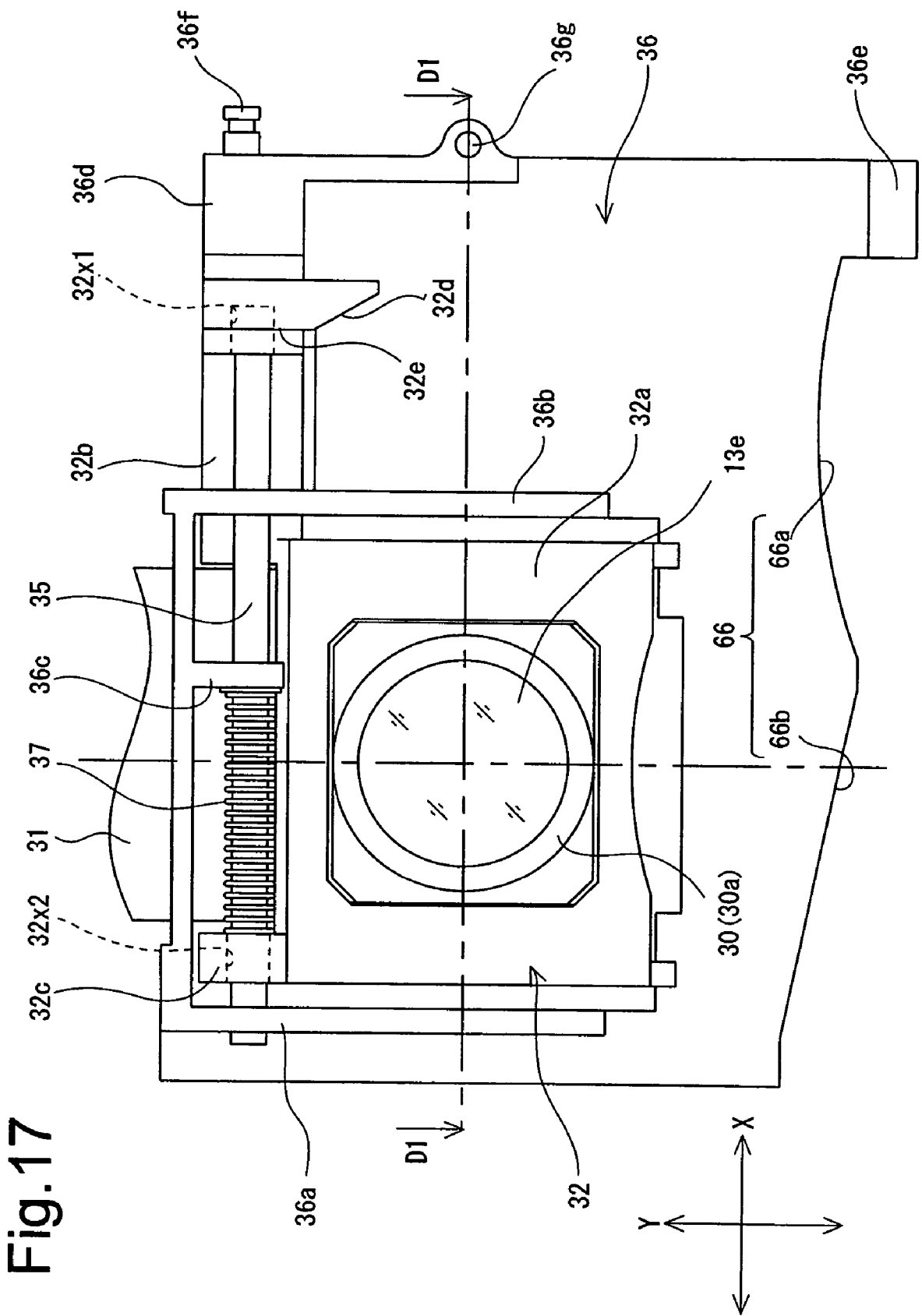
FIG. 17 is a front view of the horizontal moving frame, the vertical moving frame and the associated elements shown in FIG. 16.

As shown in FIG. 16, the horizontal moving frame 32 is supported by a vertical moving frame (movable frame) 36 to be movable with respect thereto via a horizontal guide shaft 35 extending in the x-axis direction. Specifically, the horizontal moving frame 32 is provided with a rectangular frame portion 32a which encloses the CCD holder 30 and an arm portion 32b which extends horizontally from the frame portion 32a. A spring supporting protrusion 32c is formed on an upper surface of the frame portion 32a, and an inclined surface 32d and a position restricting surface 32e are formed on an end portion of the arm portion 32b. The position restricting surface 32e is a flat surface parallel to the y-axis. On the other hand, the vertical moving frame 36 is provided with a pair of motion restricting frames 36a and 36b, a spring supporting portion 36c, an upper bearing portion 36d, and a lower bearing portion 36e. The pair of motion restricting frames 36a and 36b are provided spaced apart in the x-axis direction. The spring supporting portion 36c is located between the pair of the motion restricting frames 36a and 36b. The upper bearing portion 36d is located on a line extended from the spring supporting portion 36c in the x-axis direction. The lower bearing portion 36e is located below the upper bearing portion 36d. As shown in FIG. 17, the horizontal moving frame 32 is supported by the vertical moving frame 36 in a state where the frame portion 32a is positioned in the space between the pair of motion restricting frames 36a and 36b and where the inclined surface 32d and the position restricting surface 32e of the arm portion 32b are positioned between the motion restricting frame 36b and the upper bearing portion 36d.

One end of the horizontal guide shaft 35 is fixed to the motion restricting frame 36a of the vertical moving frame 36, and the other end of the horizontal guide shaft 35 is fixed to the upper bearing portion 36d of the vertical moving frame 36. Two through-holes are respectively formed in the motion restricting frame 36b and the spring supporting portion 36c to be horizontally aligned to each other so as to allow the horizontal guide shaft 35 to pass through the motion restricting frame 36b and the spring supporting portion 36c. Horizontal through-holes 32x1 and 32x2 (see FIG. 17) into which the horizontal guide shaft 35 is inserted are formed in the arm portion 32b and the spring supporting protrusion 32c of the horizontal moving frame 32, respectively. The horizontal through-holes 32x1 and 32x2 of the horizontal moving frame 32 and the aforementioned two through-holes which are respectively formed in the motion restricting frame 36b and the spring supporting portion 36c are horizontally aligned with each other. Since the horizontal guide shaft 35 is slidably fitted in the horizontal through-holes 32x1 and 32x2, the horizontal moving frame 32 is supported by the vertical moving frame 36 to be movable with respect to the vertical moving frame 36 in the x-axis direction. A horizontal moving frame biasing spring (biasing device) 37 is installed on the horizontal guide shaft 35 between the spring supporting protrusion 32c and the spring supporting portion 36c. The horizontal moving frame biasing spring 37 is a compression coil spring and biases the horizontal moving frame 32 in a direction (leftward as viewed in FIG. 17) to make the spring supporting protrusion 32c approach the motion restricting frame 36a.

Vertical through-holes 36y1 and 36y2 (see FIG. 16) are further formed in the upper bearing portion 36d and the lower bearing portion 36e of the vertical moving frame 36, respectively, which extend in a line along the y-axis direction which is orthogonal to the photographing optical axis Z1. The vertical through-hole 36y1 and the vertical through-hole 36y2 are vertically aligned, and a vertical guide shaft 38 (see FIGS. 8 and 9) passes through vertical through-hole 36y1 and the vertical through-hole 36y2. Both ends of the vertical guide shaft 38 are fixed to the housing 11, and therefore, the vertical moving frame 36 can move along the vertical guide shaft 38 in the y-axis direction inside the camera. More specifically, the vertical moving frame 36 can move between the photographing position shown in FIG. 1 and the retracted position shown in FIG. 2. When the vertical moving frame 36 is positioned in the photographing position as shown in FIG. 2, the centers of the third lens group 13e, the low-pass filter 13f and the CCD 13g in the CCD holder 30 are positioned on the photographing optical axis Z1. When the vertical moving frame 36 is positioned in the radially retracted position as shown in FIG. 1, the centers of the third lens group 13e, the low-pass filter 13f and the CCD 13g are positioned in the off-optical-axis retracted position Z2 that is located above the fixed ring portion 16.

The vertical moving frame 36 is provided with a spring hooking portion 36f which projects horizontally from a side surface of the vertical moving frame 36 in a direction away from the vertical through-hole 36y1, and a vertical moving frame biasing spring (biasing device) 39 is extended between the spring hooking portion 36f and a spring hooking portion 11a (see FIGS. 8 and 15) fixed to the housing 11 therein. The vertical moving frame biasing spring 39 is an extension coil spring and biases the vertical moving frame 36 downward (i.e., toward the photographing position thereof shown in FIG. 2).

As described above, the horizontal moving frame 32 that holds the CCD holder 30 is supported by the vertical moving frame 36 to be movable in the x-axis direction with respect to the vertical moving frame 36, and the vertical moving frame 36 is supported by the housing 11 via the vertical guide shaft 38 to be movable in the y-axis direction with respect to the housing 11. Image shake can be counteracted by moving the CCD holder 30 in the x-axis direction and the y-axis direction. To this end, a horizontal driving lever (swing member) 40 and a vertical driving lever (swing member) 41 are provided as elements of a driving mechanism which achieves such movement of the CCD holder 30. The horizontal driving lever 40 and the vertical driving lever 41 are pivoted on a lever pivot shaft (rotation axis of the swing member) 42 to be rotatable (swingable) independently of each other. The lever pivot shaft 42 is positioned in the housing 11 and fixed thereto to be parallel to the photographing optical axis Z1.

Figure 9:
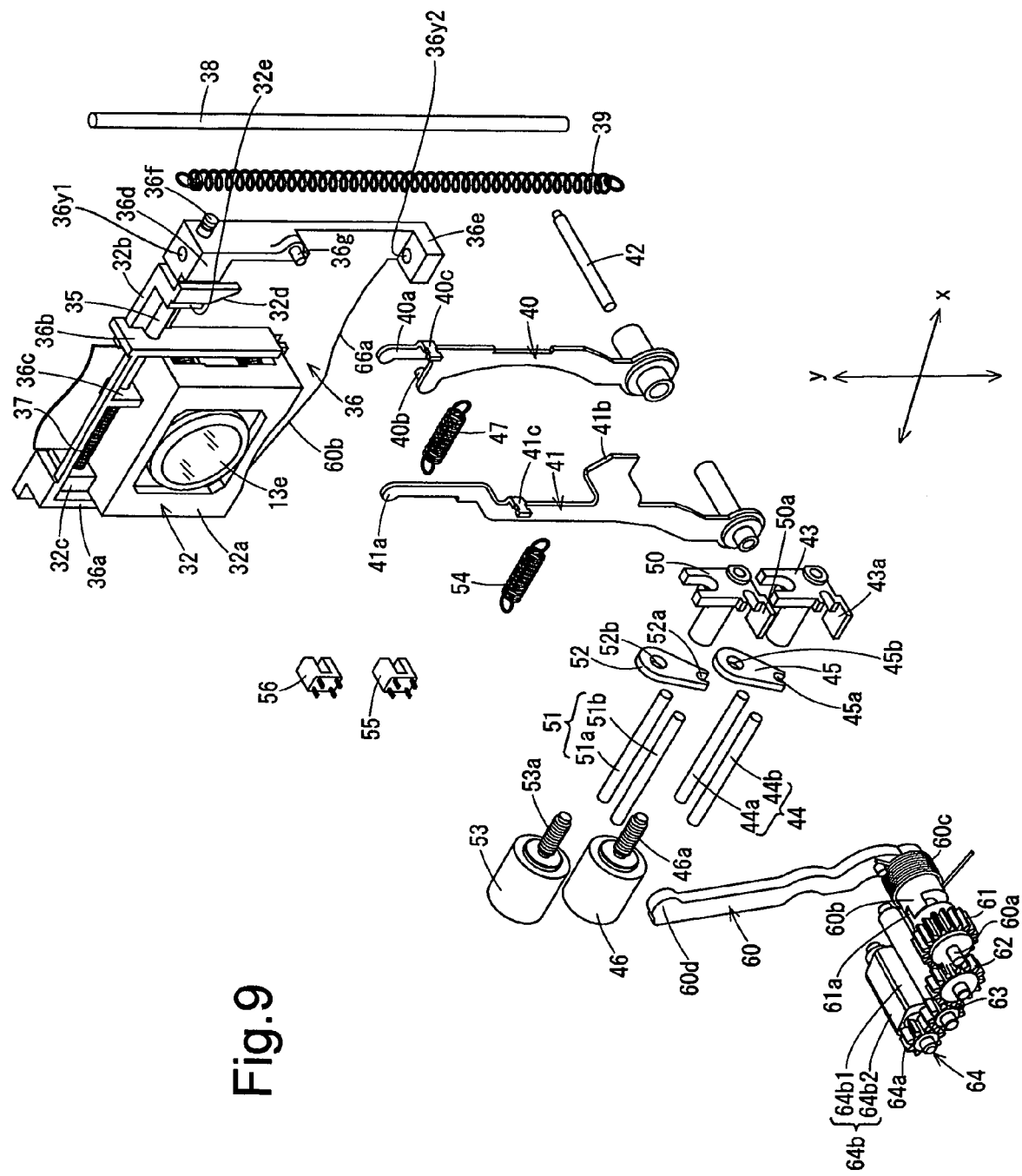
FIG. 9 is an exploded perspective view of elements of an image stabilizing mechanism and a radially-retracting mechanism which are shown in FIG. 8.
Figure 12:
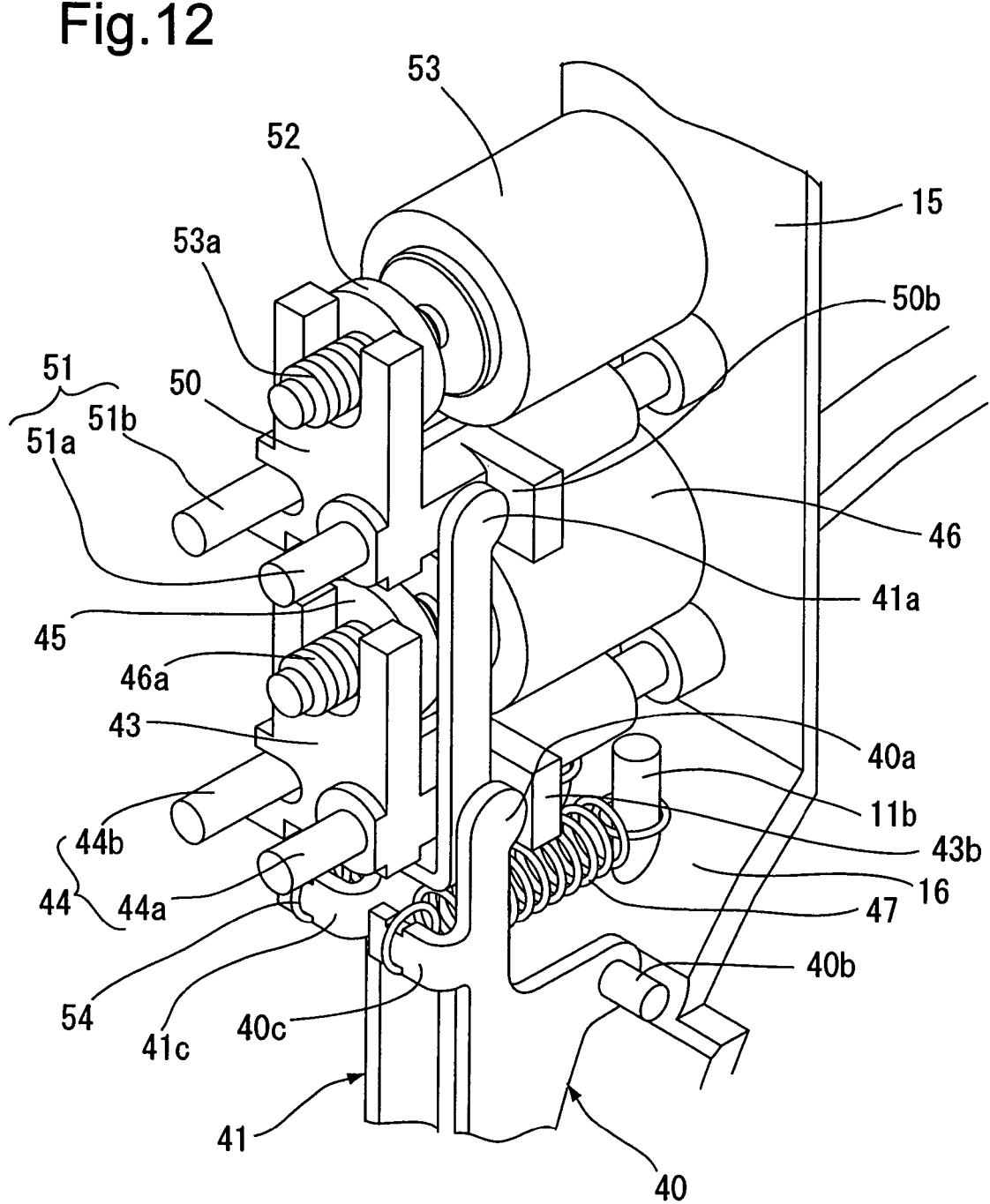
FIG. 12 is a rear perspective view of a portion of the image stabilizing mechanism as viewed from the rear side of FIGS. 10 and 11.
Figure 13:
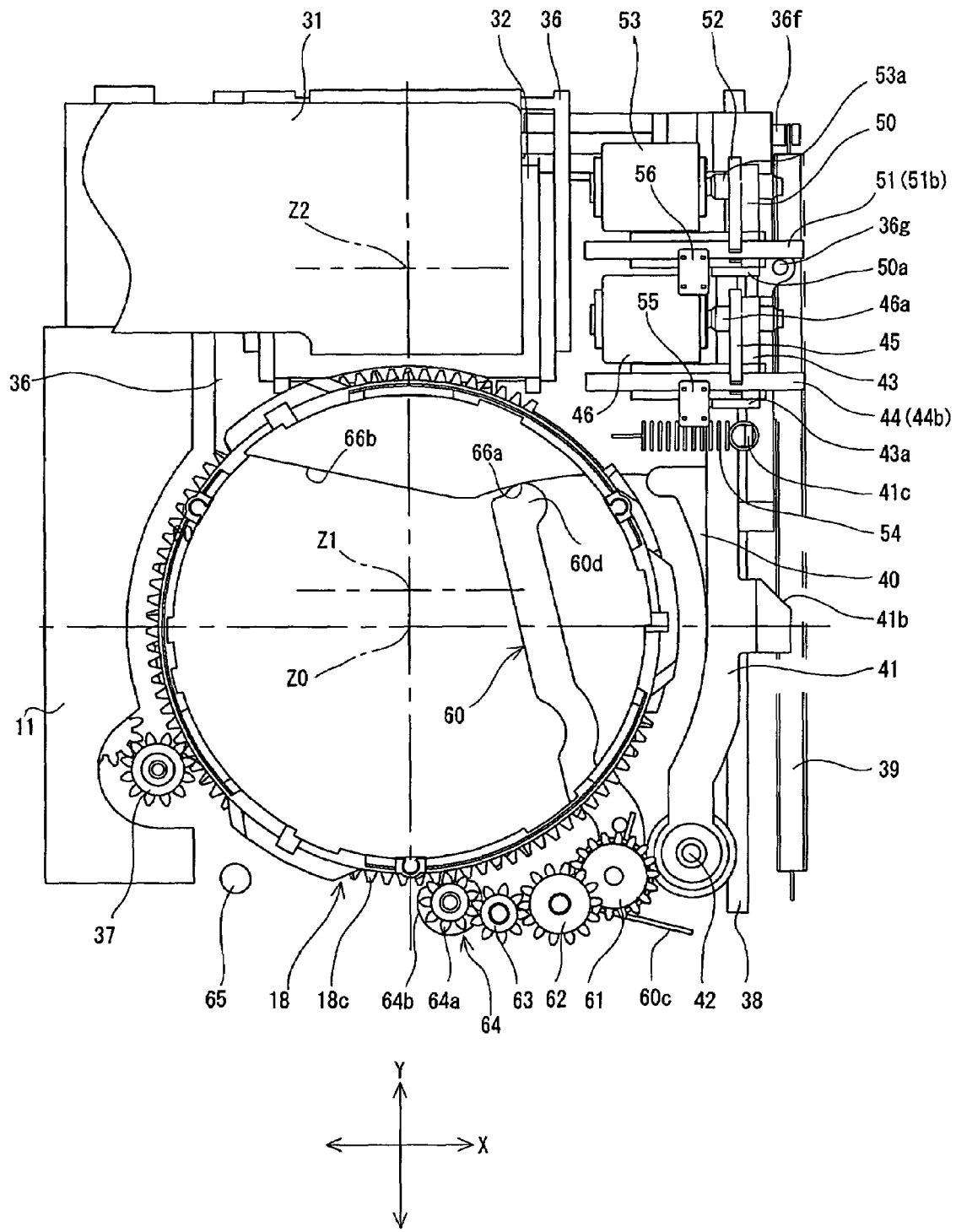
FIG. 13 is a front elevational view of the image stabilizing mechanism and the radially-retracting mechanism in the state shown in FIG. 10, as viewed from the front in the optical axis direction.
Figure 14:
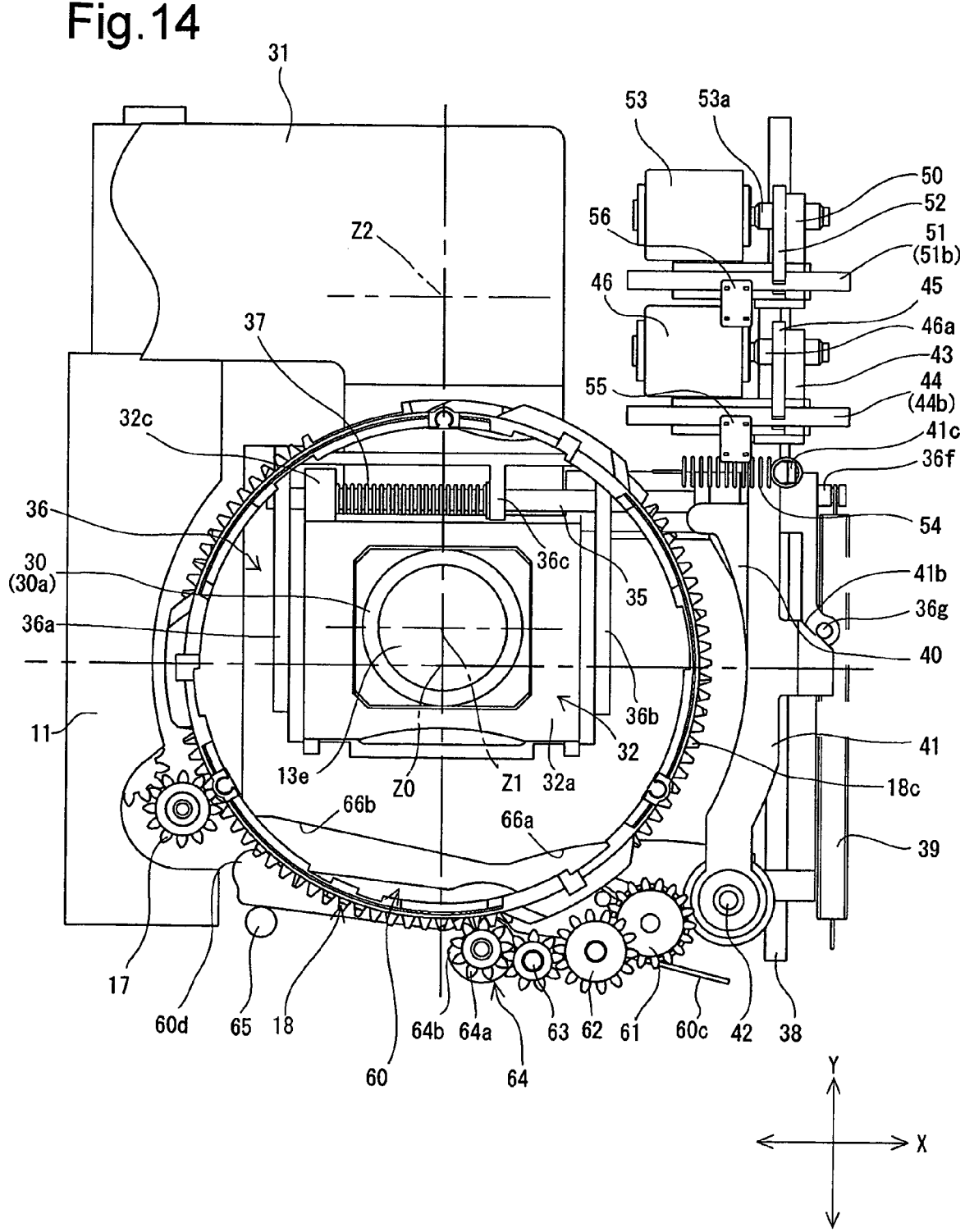
FIG. 14 is a front elevational view of the image stabilizing mechanism and the radially-retracting mechanism in the state shown in FIG. 11, as viewed from the front in the optical axis direction.
Figure 20:
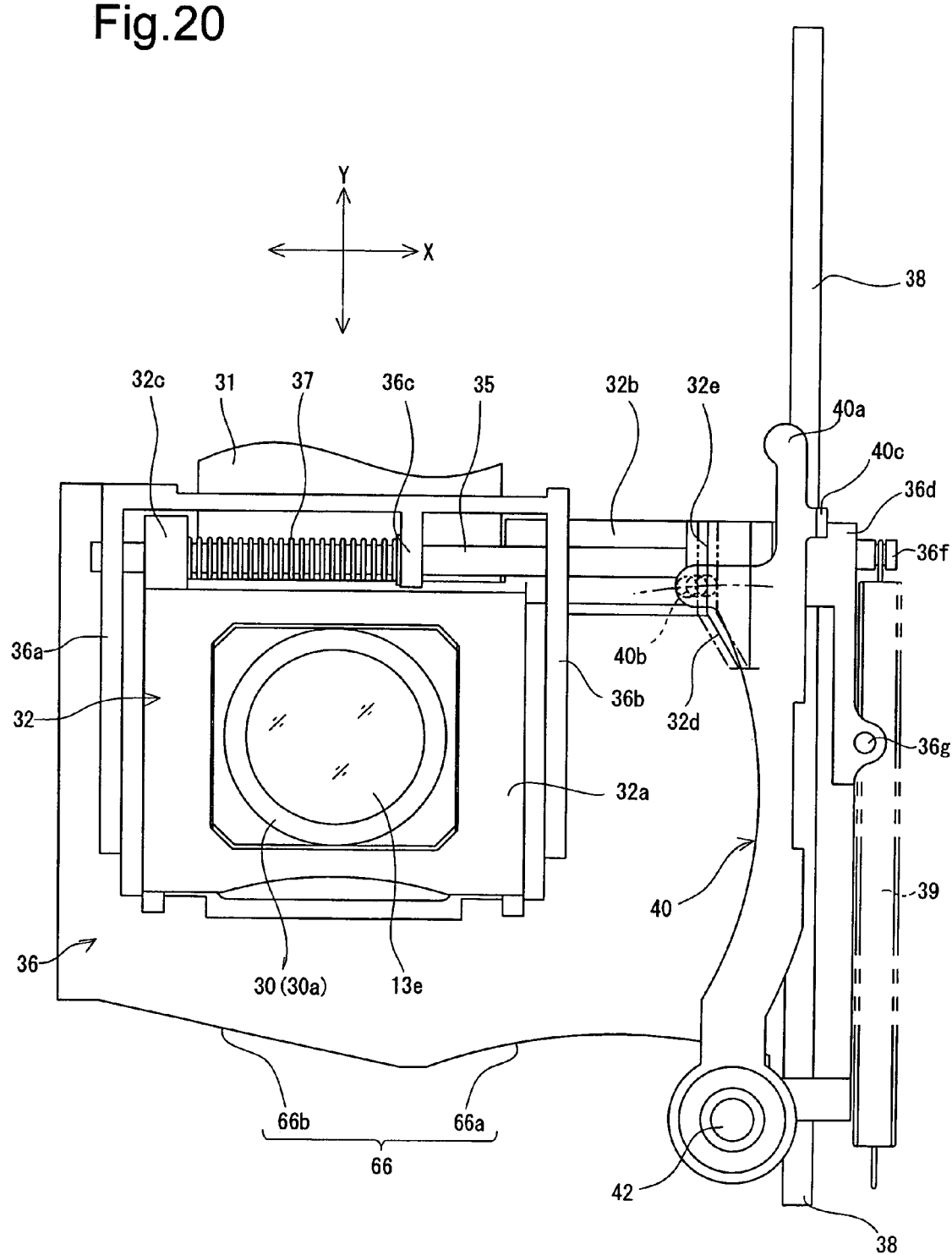
FIG. 20 is a front elevational view of the elements shown in FIGS. 16 through 17 and other associated elements, illustrating an image stabilizing action in the horizontal direction by an operation of a horizontal driving lever.

As shown in FIGS. 9 and 20, the horizontal driving lever 40 is pivoted at the lower end thereof on the lever pivot shaft 42, and is provided at the upper end of the horizontal driving lever 40 with a force-applying end 40a. The horizontal driving lever 40 is provided in the vicinity of the force-applying end 40a with an operation pin (stopper device) 40b which projects rearward in the optical axis direction and a spring hooking portion 40c which projects forward in the optical axis direction. As shown in FIG. 12, the force-applying end 40a of the horizontal driving lever 40 abuts against a lug 43b of a first moving member (swing member driving device/linearly moving member) 43. The first moving member 43 is supported by a pair of parallel guide bars 44 (44a and 44b) to be slidable thereon in the x-axis direction, and a driven nut member 45 abuts against the first moving member 43. The driven nut member 45 is provided with a female screw hole 45b and a rotation restricting groove 45a (see FIG. 9) which is slidably fitted on the guide bar 44b. A drive shaft (a feed screw/drive shaft) 46a of a first stepping motor (swing member driving device/actuator) 46 is screwed into the female screw hole 45b. As shown in FIGS. 13 and 14, the driven nut member 45 abuts against the first moving member 43 from the left side. One end of an extension coil spring (rotationally biasing member) 47 is hooked on the spring hooking portion 40c of the horizontal driving lever 40, and the other end of the spring 47 is hooked on a spring hooking portion 11b which projects from an inner surface of the housing 11 (see FIG. 12). The extension coil spring 47 biases the horizontal driving lever 40 in a direction to bring the first moving member 43 to abut against the driven nut member 45, i.e., in a counterclockwise direction as viewed in FIGS. 13, 14 and 20. Due to this structure, driving the first stepping motor 46 causes the driven nut member 45 to move along the pair of guide bars 44, and at the same time causes the first moving member 43 to move together with the driven nut member 45, thus causing the horizontal driving lever 40 to swing about the lever pivot shaft 42. Specifically, moving the driven nut member 45 rightward as viewed in FIGS. 13 and 14 causes the driven nut member 45 to press the first moving member 43 in the same direction against the biasing force of the extension spring 47, thus causing the horizontal driving lever 40 to rotate clockwise as viewed in FIGS. 13 and 14. Conversely, moving the driven nut member 45 leftward as viewed in FIGS. 13 and 14 causes the first moving member 43 to move in the same direction while following the leftward movement of the driven nut member 45 due to the biasing force of the extension coil spring 47, thus causing the horizontal driving lever 40 to rotate counterclockwise as viewed in FIGS. 13 and 14.

As shown in FIG. 20, the operation pin 40b of the horizontal driving lever 40 abuts against the position restricting surface 32e that is provided on the end portion of the arm portion 32b of the horizontal moving frame 32. Since the horizontal moving frame 32 is biased leftward as viewed in FIG. 20 by the horizontal moving frame biasing spring 37, the operation pin 40b remains in contact with the position restricting surface 32e. When the horizontal driving lever 40 swings, the position of the operation pin 40b changes along the x-axis direction, so that the horizontal moving frame 32 moves along the horizontal guide shaft 35. Specifically, rotating the horizontal driving lever 40 clockwise as viewed in FIG. 20 causes the operation pin 40b to press the position restricting surface 32e, which causes the horizontal moving frame 32 to move rightward as viewed in FIG. 20 against the biasing force of the horizontal moving frame biasing spring 37. Conversely, rotating the horizontal driving lever 40 counterclockwise as viewed in FIG. 20 causes the operation pin 40b to move in a direction away from the position restricting surface 32e (leftward as viewed in FIG. 20), which causes the horizontal moving frame 32 to move in the same direction while following the leftward movement of the operation pin 40b due to the biasing force of the horizontal moving frame biasing spring 37.

Figure 21:
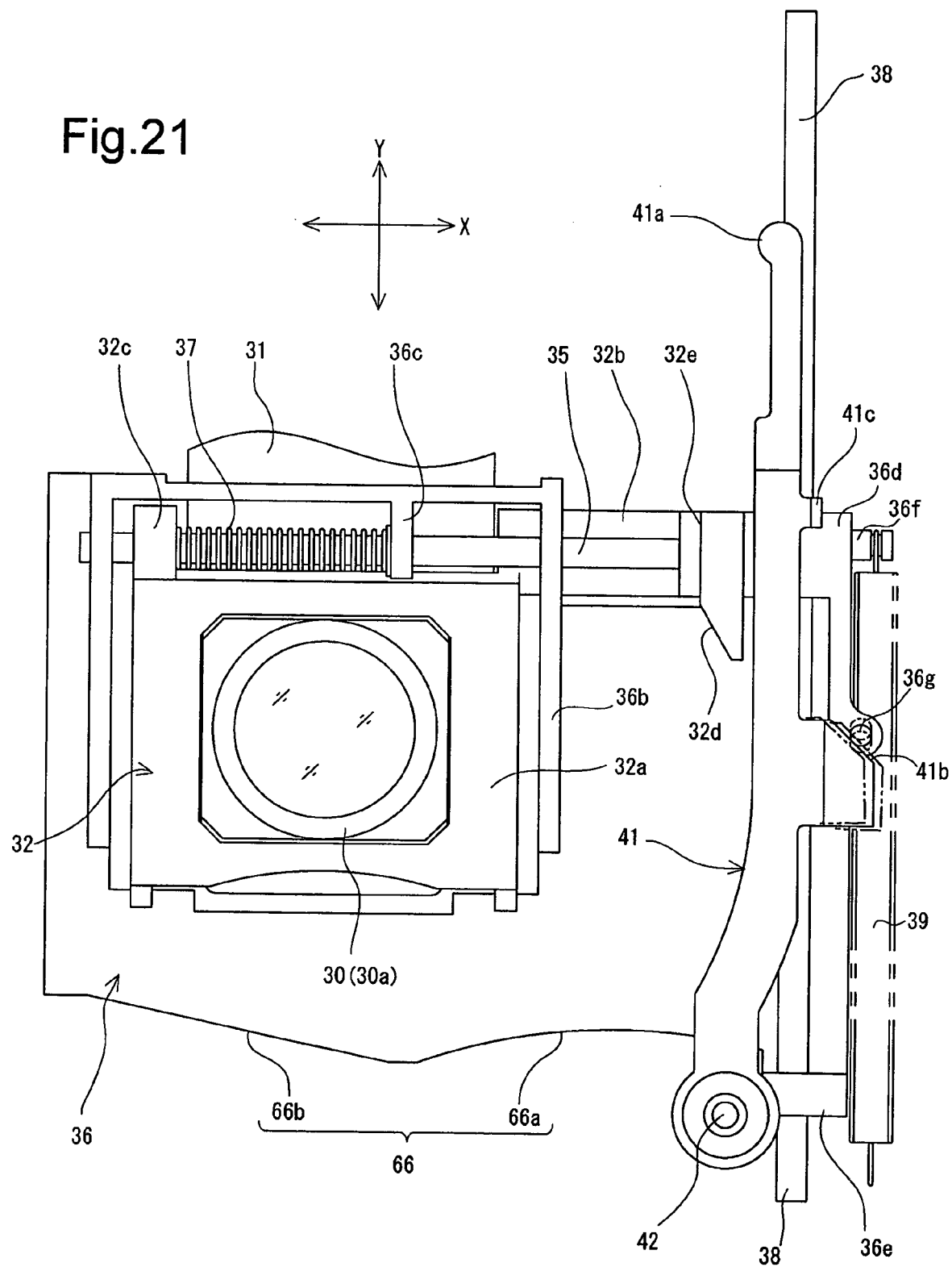
FIG. 21 is a front elevational view of the elements shown in FIG. 20, illustrating an image stabilizing action in the vertical direction by an operation of a vertical driving lever.

As shown in FIGS. 9 and 21, the vertical driving lever 41 is pivoted at its lower end on the lever pivot shaft 42, as in the case of the horizontal driving lever 40, and is provided at the upper end of the vertical driving lever 41 with a force-applying end 41a. The vertical driving lever 41 is longer than the horizontal driving lever 40, and the force-applying end 41a protrudes upward to a position higher than the position of the force-applying end 40a. The vertical driving lever 41 is provided between the lever rotating shaft 42 and the force-applying end 41a with a pressing inclined surface (stopper device/component force generating surface.) 41b which projects rightward as viewed in FIG. 21. The vertical driving lever 41 is provided above the pressing inclined surface 41b with a spring hooking portion 41c. As shown in FIG. 12, the force-applying end 41a abuts against a lug 50b of a second moving member (swing member driving device/linearly moving member) 50. The second moving member 50 is supported by a pair of parallel guide bars 51 (51a and 51b) to be slidable thereon in the x-axis direction, and a driven nut member 52 abuts against the second moving member 50. The driven nut member 52 is provided with a female screw hole 52b and a rotation restricting groove 52a which is slidably fitted on the guide bar 51b. A drive shaft (a feed screw/rotational shaft) 53a of a second stepping motor (swing member driving device/actuator) 53 is screwed into the female screw hole 52b. As shown in FIGS. 13 and 14, the driven nut member 52 abuts against the second moving member 50 from the left side as viewed from the front of the camera. One end of an extension coil spring (rotationally biasing member) 54 is hooked on the spring hooking portion 41c of the vertical driving lever 41, and the other end of the spring 54 is hooked on a spring hooking portion (not shown) formed on an inner surface of the housing 11. The extension coil spring 54 biases the vertical driving lever 41 in a direction to bring the second moving member 50 to abut against the driven nut member 52, i.e., in the counterclockwise direction as viewed in FIGS. 13, 14, and 21. Due to this structure, driving the second stepping motor 53 causes the driven nut member 52 to move along the pair of guide bars 51, and at the same time causes the second moving member 50 to move together with the driven nut member 52, thus causing the vertical driving lever 41 to swing about the lever pivot shaft 42. Specifically, moving the driven nut member 52 rightward as viewed in FIGS. 13 and 14 causes the driven nut member 52 to press the second moving member 50 in the same direction against the biasing force of the extension spring 54, thus causing the vertical driving lever 41 to rotate clockwise as viewed in FIGS. 13 and 14. Conversely, moving the driven nut member 52 leftward as viewed in FIGS. 13 and 14 causes the second moving member 50 to move in the same direction while following the leftward movement of the driven nut member 52 due to the biasing force of the extension spring 54, thus causing the vertical driving lever 41 to rotate counterclockwise as viewed in FIGS. 13 and 14.

As shown in FIG. 21, the pressing inclined surface 41b of the vertical driving lever 41 can come into contact with a pressed pin 36g which projects forward from the upper bearing portion 36d of the vertical moving frame 36. Since the vertical moving frame 36 is biased downwards as viewed in FIG. 21 by the vertical moving frame biasing spring 39, the pressed pin 36g always remains in contact with the pressing inclined surface 41b. When the vertical driving lever 41 swings, the abutting angle of the pressing inclined surface 41b relative to the pressed pin 36g changes, so that the vertical moving frame 36 moves along the vertical guide shaft 38. Specifically, rotating the vertical driving lever 41 clockwise as viewed in FIG. 21 causes the pressing inclined surface 41b to press the pressed pin 36g upward as viewed in FIG. 21, which causes the vertical moving frame 36 to move upward against the biasing force of the vertical moving frame biasing spring 39. Conversely, rotating the vertical driving lever 41 counterclockwise as viewed in FIG. 21 causes the abutting point on the pressing inclined surface 41b relative to the pressed pin 36g to descend, which causes the vertical moving frame 36 to move downward by the biasing force of the vertical moving frame biasing spring 39.

In the above-described structure, the horizontal moving frame 32 can be caused to move left or right in the x-axis direction by driving the first stepping motor 46 forward or reverse. Furthermore, the vertical moving frame 36 can be caused to move upwards or downwards in the y-axis direction by driving the second stepping motor 53 forward or reverse.

The first moving member 43 is provided with a plate portion 43a, and the second moving member 50 is provided with a plate portion 50a. The initial position of the horizontal moving frame 32 can be detected by a photo sensor 55 having a light emitter and a light receiver which are spaced apart from each other as shown in FIGS. 8, 10 and 11 when the plate portion 43a passes between the light emitter and the light receiver of the photo sensor 55. The plate portion 43a and the photo sensor 55 constitute a photo interrupter. Likewise, the initial position of vertical moving frame 36 can be detected by a photo sensor 56 having a light emitter and a light receiver which are spaced apart from each other as shown in FIGS. 8, 10 and 11 when the plate portion 50a passes between the light emitter and the light receiver of the photo sensor 56. The plate portion 50a and the photo sensor 56 constitute a photo interrupter. The two photo sensors 55 and 56 are fixed in two fixing holes 15a1 and 15a2 (see FIG. 8) formed on a front wall of the housing 11 to be supported thereby.

The present embodiment of the zoom lens camera has an image-shake detection sensor (image-shake detector) 57 (see FIG. 5) which detects the angular velocity around two axes (the vertical and horizontal axes of the camera) orthogonal to each other in a plane perpendicular to the photographing optical axis Z1. The magnitude and the direction of camera shake (vibrations) are detected by the image-shake detection sensor 57. The control circuit 14a determines a moving angle by time-integrating the angular velocity of the camera shake in the two axial directions, detected by the image-shake detection sensor 57. Subsequently, the control circuit 14a calculates from the moving angle the moving amounts of the image on a focal plane (imaging surface/light receiving surface of the CCD 13g) in the x-axis direction and in the y-axis direction. The control circuit 14 further calculates the driving amounts and the driving directions of the horizontal moving frame 32 and the vertical moving frame 36 for the respective axial directions (driving pulses for the first stepping motor 46 and the second stepping motor 53) in order to counteract the camera shake. Thereupon, the first stepping motor 46 and the second stepping motor 53 are actuated and the operations thereof are controlled in accordance with the calculated values. In this manner, each of the horizontal moving frame 32 and the vertical moving frame 36 is driven in the calculated direction by the calculated amount in order to counteract the shake of the photographing optical axis Z1 to thereby stabilize the image on the focal plane. The camera can be put into this image stabilization mode by turning on a photographing mode select switch 14e (see FIG. 5). If the switch 14e is in an off-state, the image stabilizing capability is deactivated so that a normal photographing operation is performed.

Figure 22:
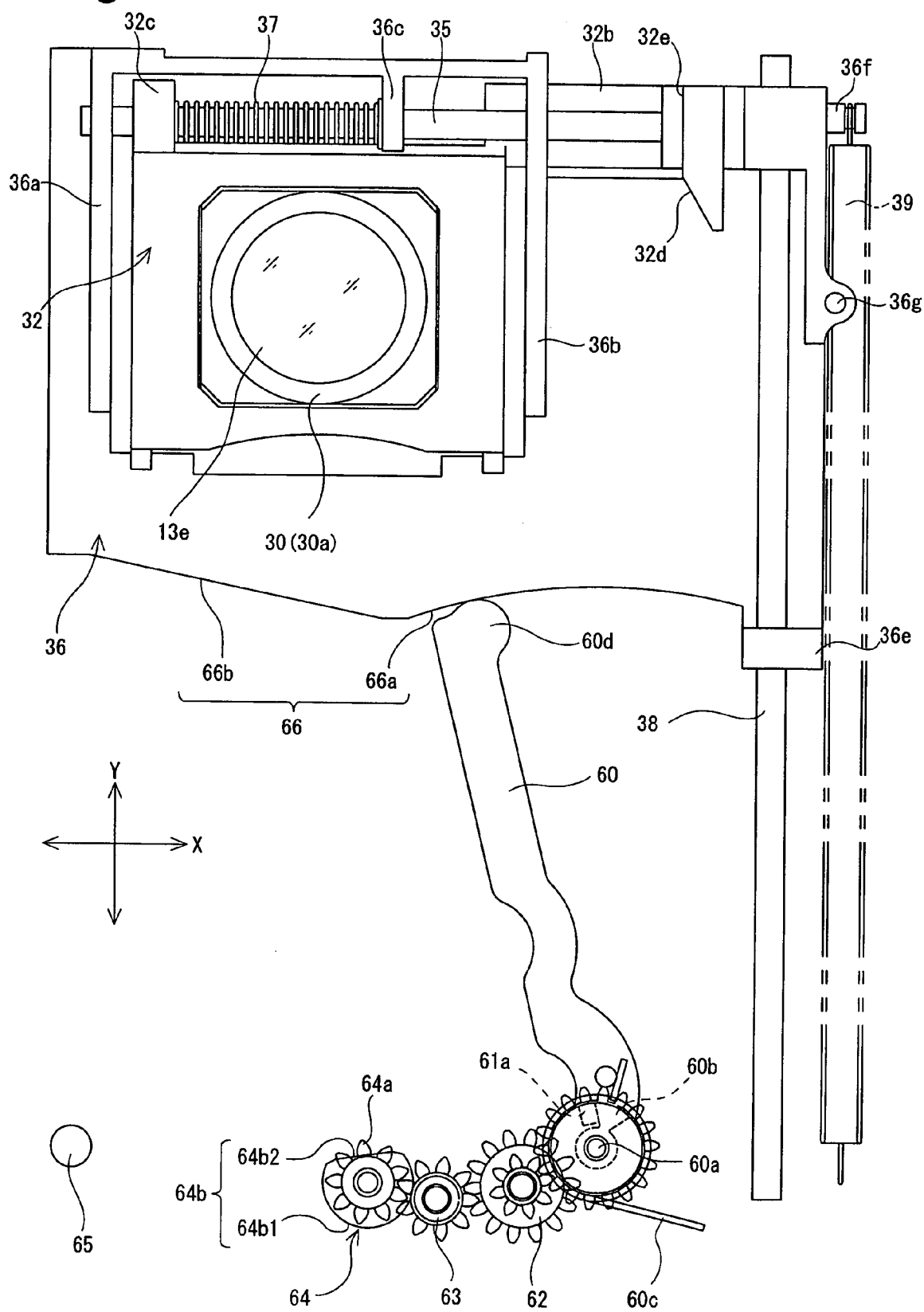
FIG. 22 is a front elevational view of elements of the image stabilizing mechanism and the radially-retracting mechanism, illustrating the retracted state of the CCD holder, the horizontal moving frame and the vertical moving frame which are retracted by an operation of a retracting lever.
Figure 23:
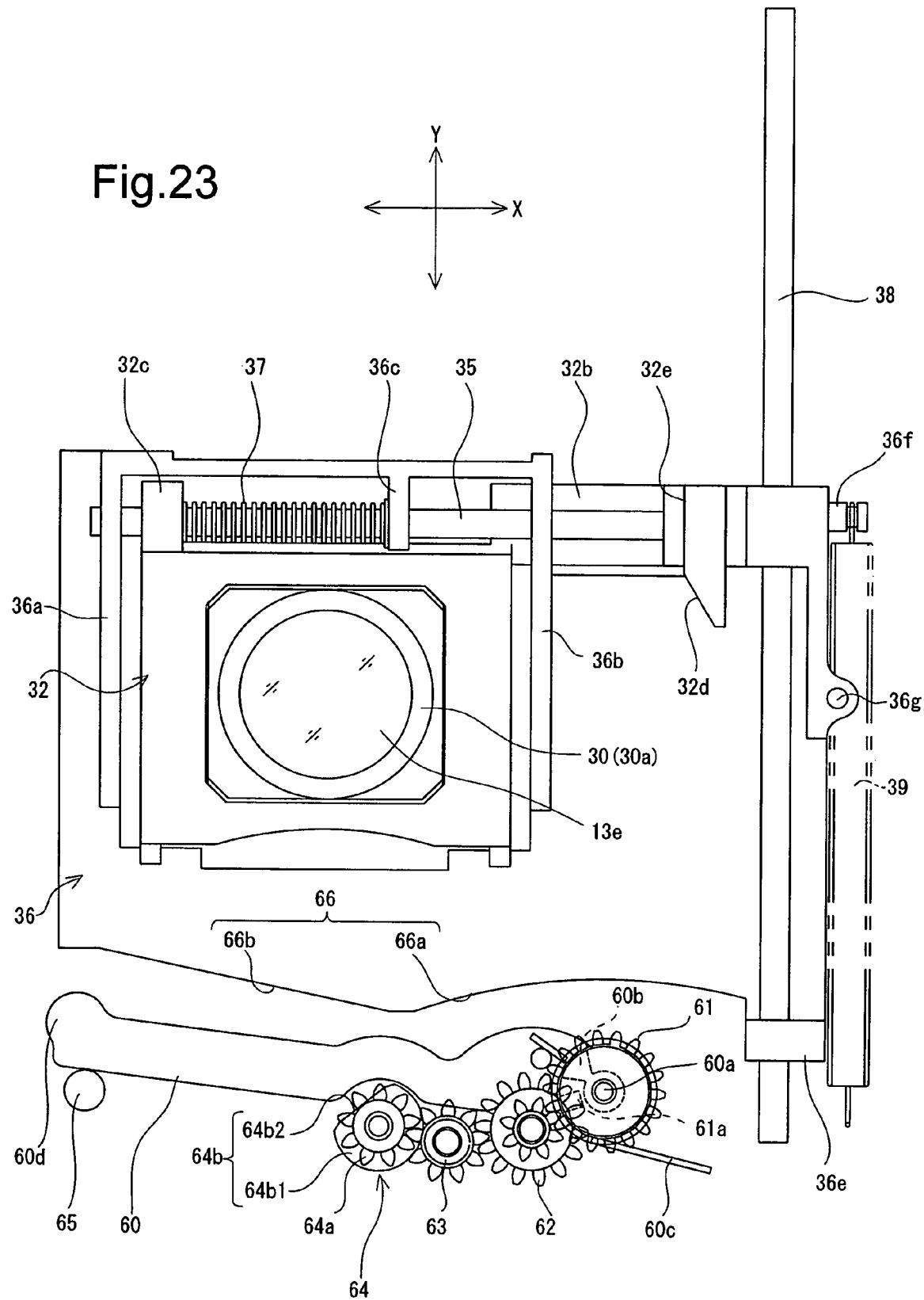
FIG. 23 is a front elevational view of the elements shown in FIG. 22, illustrating a state in which the CCD holder, the horizontal moving frame and the vertical moving frame return to their respective photographing positions where the CCD holder is positioned on the photographing optical axis when the retracting lever is disengaged from the vertical moving frame to stop upholding the vertical moving frame.

The present embodiment of the zoom lens camera uses part of the above-described image stabilizing mechanism to perform the retracting operation (radially retracting operation) of the third lens group 13e, the low-pass filter 13f and the CCD 13g toward the off-optical-axis retracted position Z2 into the retraction space SP when the zoom lens 10 is retracted from a photographic state. As shown in FIGS. 22 and 23, a retracting lever (third swing member) 60 is provided below the vertical moving frame 36. The retracting lever 60 is pivoted on a pivot shaft 60a to be rotatable (swingable) thereabout. A coaxial gear 61 is installed adjacent to the retracting lever 60, and is coaxially provided on the pivot shaft 60a to be rotatable on the pivot shaft 60a. A rotational force is transferred from an interconnecting gear 64 to the coaxial gear 61 via two relay gears 62 and 63. The pivot shaft 60a, which serves as the rotation axis of each of the retracting lever 60 and the coaxial gear 61, the rotation axes of the relay gears 62 and 63, and the rotation axis of the interconnecting gear 64 are each parallel to the rotation center axis Z0 (and the photographing optical axis Z1).

As shown in FIGS. 9, 22 and 23, the retracting lever 60 is provided in the vicinity of the pivot shaft 60a with a rotation transfer protrusion 60b having a sector-shaped cross section and projecting forward in the optical axis direction. The coaxial gear 61 is provided, at a rear end thereof, with a rotation transfer protrusion 61a which projects rearward in the optical axis direction, has the same diameter of that of the rotation transfer protrusion 60b, and is coaxial with the pivot shaft 60a. Namely, the rotation transfer protrusion 60b and the rotation transfer protrusion 61a have the same diameter and are positioned on the pivot shaft 60a to be circumferentially engageable with each other. The coaxial gear 61 transfers a rotation thereof to the retracting lever 60 by engaging the rotation transfer protrusion 61a with the rotation transfer protrusion 60b of the retracting lever 60. When the coaxial gear 61 rotates in a direction to disengage the rotation transfer protrusion 61a from the rotation transfer protrusion 60b, the rotational force of the coaxial gear 61 is not transferred to the retracting lever 60. The retracting lever 60 is biased to rotate counterclockwise as viewed in FIGS. 22 and 23 by a torsion spring 60c, and the housing 11 is provided therein with a stop projection 65 (see FIGS. 13, 14, 22 and 23) which defines the limit of rotation of the retracting lever 60 in the biasing direction of the torsion spring 60c. Namely, the retracting lever 60 comes in contact with the stop projection 65 as shown in FIG. 23 when fully rotated counterclockwise as viewed in FIGS. 22 and 23.

The vertical moving frame 36 is provided on a bottom surface thereof with an abutment surface 66 consisting of an arc-shaped surface 66a and a leading surface 66b. The arc-shaped surface 66a has an arc shape which corresponds to an arc pivoted on the axis of the pivot shaft 60a of the retracting lever 60, and the leading surface 66b is formed as a flat inclined surface. The lowermost point of the leading surface 66b is located at the portion thereof which is connected to the arc-shaped surface 66a, and the leading surface 66b gradually rises in a direction away from the arc-shaped surface 66a (in a direction to approach the left side surface of the vertical moving frame 36 as viewed in FIGS. 22 and 23).

The interconnecting gear 64 is provided with a gear portion 64a and a rotation restricting portion 64b at different positions in the axial direction of interconnecting gear 64. The rotation restricting portion 64b has a non-circular (D-shaped) cross-sectional shape and includes a large-diameter cylindrical portion 64b1 and a flat portion 64b2. The large-diameter cylindrical portion 64b1 has an incomplete cylindrical shape having a diameter larger than that of the gear portion 64a. The flat portion 64b2 is formed on the rotation restricting portion 64b in a manner so that a part of the large diameter cylindrical portion 64b1 appears to be cut off to form a nearly flat shape. In an area in which the flat portion 64b2 is formed, the tips of the teeth of the gear portion 64a project radially outwards from the rotation restricting portion 64b. The flat portion 64b2 is formed as a flat surface which includes a straight line parallel to the axis of rotation of the interconnecting gear 64.

The interconnecting gear 64 is positioned to face the outer surface of the helicoid ring 18. The spur gear 18c faces either the gear portion 64a of the interconnecting gear 64 (in the state shown in FIGS. 11 and 14) or the rotation restricting portion 64b (in the state shown FIGS. 10 and 13) depending on the axial position (and the type of motion) of the helicoid ring 18 in the optical axis direction. When the helicoid ring 18 rotates at a fixed position as described above, the spur gear 18c is engaged with the gear portion 64a. As the helicoid ring 18 moves in the retracting direction from the fixed-position rotating state, the spur gear 18c is disengaged from the interconnecting gear 64 to face the rotation restricting portion 64b, so that the transfer of rotation of the helicoid ring 18 to the interconnecting gear 64 is stopped.

The operation of the retracting lever 60 will be discussed in detail hereinafter. FIG. 23 shows elements of the image stabilizing mechanism and the retracting mechanism in a state where the zoom lens 10 is set at the wide-angle extremity. In this state, the third lens group 13e, the low-pass filter 13f and the CCD 13g are positioned on the photographing optical axis Z1 (see the upper half of the zoom lens 10 shown in FIG. 2), and also the helicoid ring 18 is in a state where the helicoid ring 18 is only allowed to rotate at a fixed position in the optical axis direction (see FIG. 6) while the gear portion 64a of the interconnecting gear 64 is engaged with the spur gear 18c of the helicoid ring 18. When the helicoid ring 18 rotates in the retracting direction from the wide-angle extremity, the coaxial gear 61 rotates clockwise as viewed in FIG. 23 via the interconnecting gear 64 and the relay gears 62 and 63. As shown in FIG. 23, since the rotation transfer protrusion 61a and the rotation transfer protrusion 60b are slightly apart from each other when the zoom lens 10 is set at the wide-angle extremity, no rotational force is transferred from the coaxial gear 61 to the retracting lever 60 for a short period of time after the coaxial gear 61 starts rotating. Accordingly, the retracting lever 60 is held in the position shown in FIG. 23 where the retracting lever 60 is in contact with the stop projection 65 due to the biasing force of the torsion spring 60c. Thereafter, upon the rotation transfer protrusion 61a coming into contact with the rotation transfer protrusion 60b and pressing the rotation transfer protrusion 60b, the retracting lever 60 starts rotating clockwise with respect to FIG. 23 against the biasing force of the torsion spring 60c. In the present embodiment, the timing of the commencement of rotation of the retracting lever 60 substantially corresponds to the angular position θ2 at which the cam ring 26 starts retracting in the optical axis direction from the fixed position rotation state (see FIG. 6).

When the retracting lever 60 rotates clockwise from the angular position shown in FIG. 23, a force-applying end 60d formed at the free end of the retracting lever 60 is brought into contact with the leading surface 66b of the abutment surface 66 of the vertical moving frame 36. A further clockwise rotation of the retracting lever 60 causes the retracting lever 60 to lift the vertical moving frame 36 according to the inclined shape of the leading surface 66b, thus causing the vertical moving frame 36 to move upward in the housing 11 along the vertical guide shaft 38.

Figure 15:
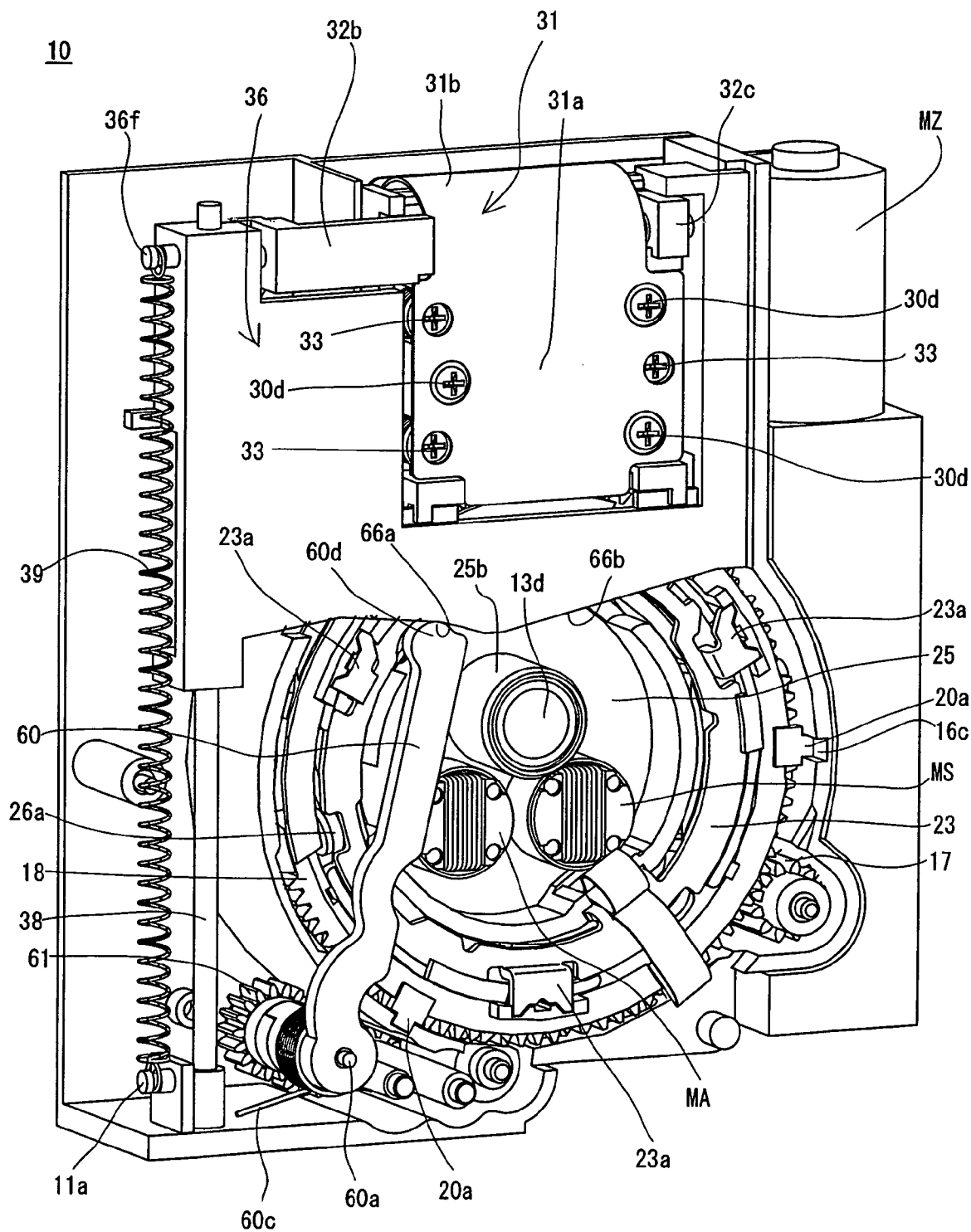
FIG. 15 is a rear perspective view of the zoom lens in the retracted state of the zoom lens shown in FIG. 1.

On and after the angular position exceeding θ1 shown in FIG. 6, when the helicoid ring 18 rotates in the retracting direction, the rotating operation of the helicoid ring 18 at a fixed position in the optical axis direction ends, and subsequently the helicoid ring 18 starts moving rearward in the optical axis direction while rotating. Thereupon, the spur gear 18c of the helicoid ring 18 is disengaged from the gear portion 64a of the interconnecting gear 64, which in turn faces the flat portion 64b2 of the rotation restricting portion 64b. Since each of the spur gear 18c and the gear portion 64a has a predetermined length in the optical axis direction, the engagement between the spur gear 18c and the gear portion 64a is not released at once immediately after the fixed-position rotating state of the helicoid ring 18 changes to the rotating and retracting state thereof at the angular position θ1, but is released at an angular position θ3 at which the helicoid ring 18 further retracts in the retracting direction by a small amount of movement. Due to this disengagement of the spur gear 18c from the gear portion 64a, the rotational force of the helicoid ring 18 is no longer transferred to the interconnecting gear 64, so that the upward rotational motion of the retracting lever 60 is terminated. FIGS. 15 and 22 show the retracting lever 60 in a state in which the upward rotational motion thereof has been terminated. As can be seen in FIG. 22, the force-applying end 60d of the retracting lever 60 is in contact with the arc-shaped surface 66a after passing the boundary between the arc-shaped surface 66a and the leading surface 66b. In this state, the vertical moving frame 36 lifted by the retracting lever 60 have been moved into the retraction space SP in the housing 11 as shown in FIG. 1.

The retracting operation of the zoom lens 10 is not completed at the angular position θ3 where the upward retracting motion of the vertical moving frame 36 is completed; the helicoid ring 18 and the cam ring 26 further move rearward in the optical axis direction while rotating. Thereafter, when the helicoid ring 18 and the cam ring 26 reach their respective retracted positions shown in FIG. 1, the cylindrical portion 25b of the second lens group support frame 25 that holds the second lens group 13d is retracted into the space in the housing 11 which is formerly occupied by the vertical moving frame 36 when the zoom lens 10 is in a photographic state. In this manner, the thickness of the photographing optical system in the optical axis direction can be reduced in the retracted state of the zoom lens 10, which makes it possible to reduce the thickness of the zoom lens 10, which in turn makes it possible to reduce the thickness of a camera incorporating the zoom lens 10.

In the above-described retracting operation of the zoom lens 10, after the zoom lens 10 retracts to the angular position θ3 where the engagement between the gear portion 64a of the interconnecting gear 64 and the spur gear 18c of the helicoid ring 18 is released, the spur gear 18c faces the flat portion 64b2 of the rotation restricting portion 64b. In this state where the spur gear 18c faces the flat portion 64b2, the flat portion 64b2 is positioned in close vicinity of the tooth top (outermost periphery/addendum circle) of the spur gear 18c. Therefore, even if the interconnecting gear 64 tries to rotate, the flat portion 64b2 abuts against the outer periphery of the spur gear 18c to prevent the interconnecting gear 64 from rotating (see FIGS. 10 and 13). In this manner, the interconnecting gear 64 is prevented from rotating accidentally in the retracted state of the zoom lens 10, and thus the retracting lever 60 can be securely locked in the upper rotational position. In other words, in the retracted state shown in FIG. 22, although the retracting lever 60 is biased counterclockwise as viewed in FIG. 22 by the torsion spring 60c, the retracting lever 60 is prevented from rotating counterclockwise by a gear train consisting of the coaxial gear 61, the pair of relay gears 62 and 63 and the interconnecting gear 64. The abutting physical relationship between the flat portion 64b2 of the interconnecting gear 64 and the spur gear 18c serves as a rotation restricting device for restricting rotation of the retracting lever 60. Therefore, the retracting lever 60 can be securely held in a halting state without any complicated locking mechanism.

In a state in which the vertical moving frame 36 is radially retracted upward completely out of the linear retracting path of the first and second lens groups 13a and 13d, the force-applying end 60d of the retracting lever 60 abuts against the arc-shaped surface 66a which has an arc-shaped surface having its center on the axis of the pivot shaft 60a of the retracting lever 60. Therefore, even if the angle of the retracting lever 60 is changed, the vertical position of the vertical moving frame 36 is not changed and held constant so long as the force-applying end 60d abuts against the arc-shaped surface 66a.

The operation of the retracting mechanism from the wide-angle extremity to the retracted position has been described above. On the other hand, in the zooming range from the wide-angle extremity to the telephoto extremity, the spur gear 18c of the helicoid ring 18 rotating at a fixed position remains engaged with the gear portion 64a of the interconnecting gear 64, and thus the interconnecting gear 64 is rotated according to the rotation of the helicoid ring 18. However, rotating the helicoid ring 18 from the wide-angle extremity state shown in FIG. 23 toward the telephoto extremity causes the coaxial gear 61 to rotate counterclockwise as viewed in FIG. 23, i.e., in a direction to move the rotation transfer protrusion 61a away from the rotation transfer protrusion 60b. Therefore, in the zooming range from the wide-angle extremity to the telephoto extremity, no rotational force is transferred to the retracting lever 60, and the retracting lever 60 is held at the angular position shown in FIG. 23. In this manner, the range of rotation of the retracting lever 60 can be minimized, thereby preventing an increase in size of the zoom lens barrel.

Figure 24:
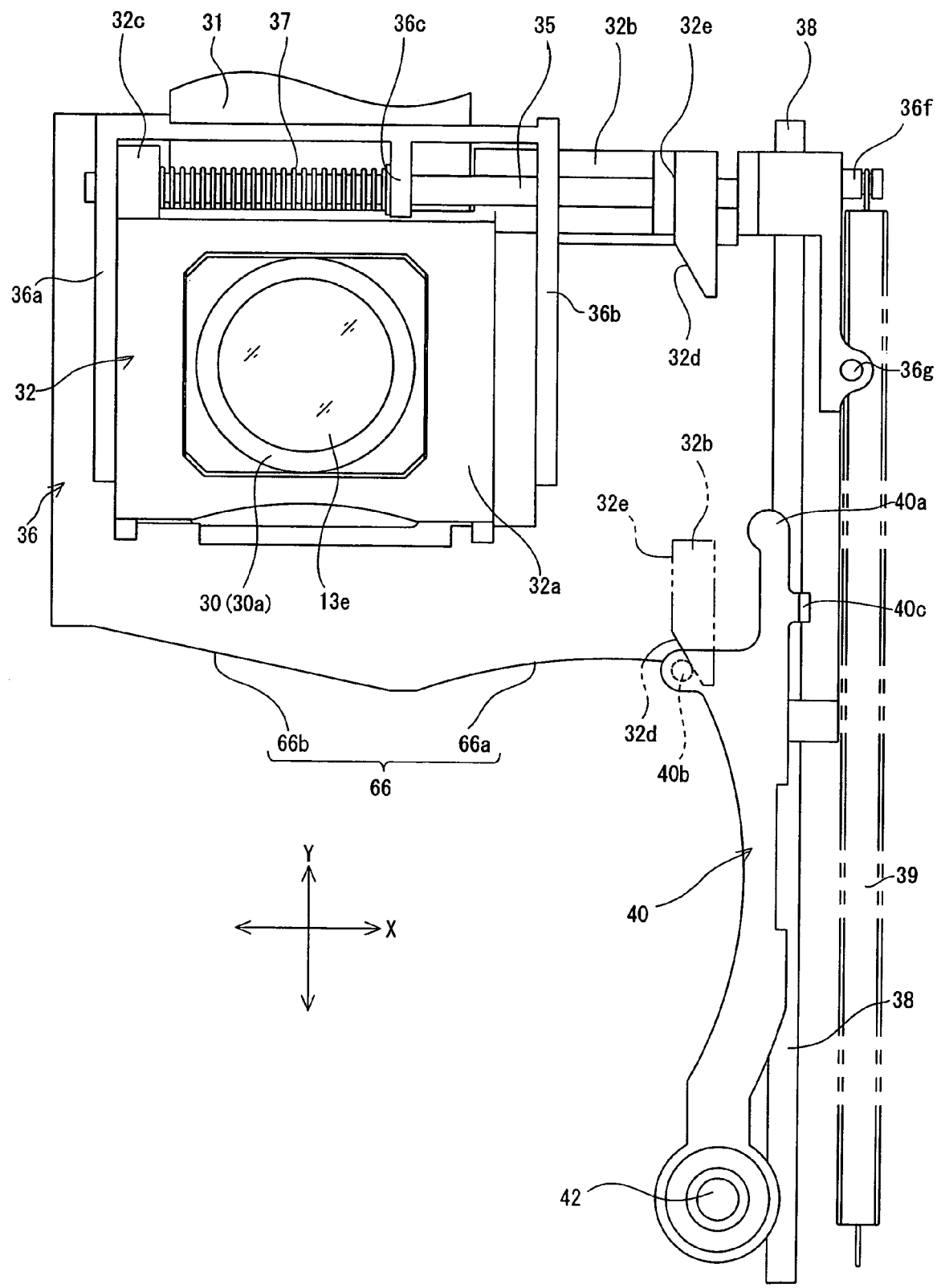
FIG. 24 is a front elevational view of elements shown in FIG. 8 for illustrating the relationship between the horizontal driving lever and the vertical motion of the CCD holder, the horizontal moving frame, and the vertical moving frame.

When the vertical moving frame 36 is retracted upward to the off-optical-axis retracted position Z2 as shown in FIG. 24, the position restricting surface 32e that is provided on the arm portion 32b of the horizontal moving frame 32 is disengaged from the operation pin 40b that is provided on the horizontal driving lever 40. This disengagement of the position restricting surface 32e from the operation pin 40b causes the horizontal moving frame 32 to move leftward as viewed in FIG. 24 by the biasing force of the horizontal moving frame biasing spring 37 up to a point at which the frame portion 32a of the horizontal moving frame 32 abuts against the motion restricting frame 36a of the vertical moving frame 36. From this state, upon the vertical moving frame 36 being moved down to the photographing optical axis Z1, the inclined surface 32d of the horizontal moving frame 32 comes in contact with the operation pin 40b as shown by two-dot chain lines in FIG. 24. The inclined surface 32d is inclined so as to guide the operation pin 40b to the position restricting surface 32e side according to the downward motion of the vertical moving frame 36. Therefore, upon the vertical moving frame 36 being moved down to the photographing position, the operation pin 40b is again engaged with the position restricting surface 32e as shown in FIG. 20 and the frame portion 32a of the horizontal moving frame 32 returns to the neutral position thereof between the motion restricting frame 36a and the motion restricting frame 36b.

As described above, the third lens group 13e, the low-pass filter 13f, and the CCD 13g are held by the CCD holder 30 as a unit. This unit is supported via the horizontal moving frame 32 serving as a movable frame in the x-axis direction and the vertical moving frame 36 serving as a movable frame in the y-axis direction. Also, the unit is moved within a plane perpendicular to the photographing optical axis Z1 when image shake is corrected. The horizontal moving frame 32 is biased along the x-axis by the horizontal moving frame biasing 37, and the biasing force of the spring 37 causes the position restricting surface 32e to abut against the operation pin 40b of the horizontal driving lever 40. The vertical moving frame 36 is biased along the y-axis by the vertical moving frame biasing spring 39, and the biasing force of the spring 39 causes the pressed pin 36g to abut against the pressing inclined surface 41b of the vertical driving lever 41. When the horizontal driving lever 40 is rotationally moved, the horizontal moving frame 32 moves in the x-axis direction according to the positional change of the operation pin 40b. Furthermore, when the vertical driving lever 41 is rotationally moved, the vertical moving frame 36 moves in the y-axis direction according to the positional change of the pressing inclined surface 41b. In other words, the operation pin 40b is provided to serve as a stopper (an abutting member) which receives the biasing force of the horizontal moving frame biasing spring 37 in the x-axis direction, and the pressing inclined surface 41b is provided to serve as a stopper (an abutting member) which receives the biasing force of the vertical moving frame biasing spring 39 in the y-axis direction. The operation pin 40b defines an x-direction movement extremity of the horizontal moving frame 32, and the pressing inclined surface 41b defines a y-direction movement extremity of the vertical moving frame 36. By moving each of the stopper members, an image shake correction action is performed on shake correcting optical components including the third lens group 13e, the low-pass filter 13f, and the CCD 13g. In the above described construction, the third lens group 13e, the low-pass filter 13f, and the CCD 13g can be reliably positioned without causing displacement in the x-axis and y-axis directions. In addition, by use of the above simple structure, image shake correction can be performed by moving the shake correcting optical components in the x-axis and y-axis directions.

The operation pin 40b and the pressing inclined surface 41b which serve as the stopper member are caused to move by the rotational motions of the horizontal and vertical driving levers 40 and 41, respectively. The horizontal and vertical levers 40 and 41 are rotatably supported by the common pivot shaft 42 and, as shown in FIGS. 9 through 14, extend upward from the pivot shaft 42 so as to be substantially parallel to each other. Thus, these levers 40 and 41 are arranged in a space efficient manner, thereby contributing to the miniaturization of the image stabilizer.

The vertical driving lever 41 has the longitudinal direction thereof oriented approximately along the y-axis, and the position of the pressing inclined surface 41b moves approximately along the x-axis when the lever 41 rotationally moves forwardly or reversely. Accordingly, the pressing inclined surface 41b is formed as a surface inclined with respect to the x-axis and the y-axis such that the motion of the surface 41b in the x-axis direction causes a moving force in the y-axis direction to be applied to the vertical moving frame 36. Furthermore, the tangent of the rotational motion trajectory of the vertical driving lever 41 is substantially perpendicular to the y-axis. In this manner, when the lever 41 rotationally moves, the y-axis component of the moving force is applied to the vertical moving frame 36 via the pressing inclined surface 41b, thereby causing the vertical moving frame 36 to move in the y-axis direction.

Furthermore, as shown in FIGS. 9 through 14, the first and second stepping motors 46 and 53 are arranged adjacent to each other in the y-axis direction such that the drive shafts 46a and 53a thereof are oriented in the x-axis direction and parallel to each other. The first moving member 43 moves forward or backward (left or right) in the x-axis direction according to the normal or reverse rotation of the drive shaft 46a, thereby causing the horizontal driving lever 40 to rotationally move. Furthermore, the second moving member 50 moves forward or backward (left or right) in the x-axis direction according to the forward or reverse rotation of the drive shaft 53a, thereby causing the vertical driving lever 41 to rotationally move. Therefore, the rotational motion driving mechanism for rotationally moving the horizontal and vertical driving levers 40 and 41 is arranged in a space efficient manner.

In the present embodiment, the retracting lever (swing member) 60 is further provided in addition to the horizontal and vertical driving levers 40 and 41. The rotational motion of the retracting lever 60 causes the third lens group 13e, the low-pass filter 13f, and the CCD 13g to move so as to radially retract along the y-axis to the off-optical-axis retracted position Z2 when the camera is in a non-photographing state. In this manner, the thickness of the zoom lens 10 can be reduced in the non-photographing state. In addition, the vertical guide shaft 38 is utilized not only by the retracting mechanism for radial-retracting movement to the off-optical-axis retracted position Z2 but also by the image stabilizing mechanism for movement in the y-axis direction. Therefore, the number of the components of the radial-retracting mechanism can be reduced, and hence, the radial-retracting mechanism can be made compact and be produced at low cost.

Although the present invention has been described based on the above illustrated embodiment, the present invention is not limited solely to the particular embodiment. For example, although the present embodiment is applied to a zoom lens barrel, the present invention can be applied to an imaging device other than a zoom lens.

In the illustrated embodiment, the third lens group 13e, the low-pass filter 13f, and the CCD 13g linearly move in the x-axis direction and the y-axis direction within a plane perpendicular to the photographing optical axis Z1. Although the x-axis and the y-axis are perpendicular to each other in the illustrated embodiment, the directions of such movement may not be perpendicular to each other.

In addition, the optical components for the image shake correction are not limited to linear movement. For example, the image shake correction can be performed in a manner in which the optical components are swung about a pivotal axis parallel to the optical axis.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging devices, comprising:
   an image-shake detector for detecting a direction and magnitude of an amount of vibration applied to a photographing optical system;
   first and second movable frames, each for supporting a common image-stabilizing optical element, which constitutes a part of said photographing optical system, so as to be movable in two directions different from each other in a plane orthogonal to a common optical axis of said photographing optical system;
   first and second biasing devices for biasing said first and second movable frames, respectively, in the respective moving directions thereof;
   first and second stopper devices for determining movement extremities of said first and second movable frames, respectively, in respective biasing directions of said first and second biasing devices; and
   a driving device for counteracting image shake by driving said first and second stopper devices in accordance with an output of said image-shake detector to thereby move said first and second movable frames, respectively,
   wherein said driving device comprises:
   a first actuator having a first rotational shaft;
   a second actuator having a second rotational shaft;
   a first linearly moving member that is moved forward and rearward in a direction parallel to the first rotational shaft of said first actuator by forward and reverse rotations of said first rotational shaft; and
   a second linearly moving member that is moved forward and rearward in a direction parallel to the second rotational shaft of said second actuator by forward and reverse rotations of said second rotational shaft.

2. The imaging device according to claim 1,
   wherein said first movable frame directly supports said common image-stabilizing optical element, and
   wherein said second movable frame supports said first movable frame so as to be relatively movable thereto.

3. The imaging device according to claim 1,
   wherein said first and second movable frames linearly move in respective directions perpendicular to each other within said plane orthogonal to said common optical axis.

4. The imaging device according to claim 1, wherein said driving device comprises:
   a first swing member which is rotatable about a rotation axis parallel to said common optical axis of said photographing optical system, wherein said first stopper device is provided on said first swing member at a position eccentric to said rotation axis;
   a second swing member which is rotatable about a rotation axis parallel to said common optical axis of said photographing optical system, wherein said second stopper device is provided on said second swing member at a position eccentric to said rotation axis; and
   a swing member driving device for rotating each of said first swing member and said second swing member by a predetermined angle in accordance with the output of said image-shake detector.

5. The imaging device according to claim 4,
   wherein said first and second swing members are pivotally supported by a common shaft at said rotation axis.

6. The imaging device according to claim 4,
   wherein said first and second swing members comprise a pair of swing levers which extend in a direction perpendicular to said common optical axis and are substantially parallel to each other.

7. The imaging device according to claim 4,
   wherein at least one of said first and said second stopper devices comprises a component force generating surface which abuts against corresponding one of said first and second movable frames and applies thereto a moving force component in a direction substantially perpendicular to a tangent of a rotational motion trajectory of one of said first and second swing members provided with said one of said first and second stopper devices having said component force generating surface.

8. The imaging device according to claim 4,
   wherein at least one of said first and second stopper devices comprises a pin which abuts against a position restricting surface of a corresponding one of said first and second movable frames.

9. The imaging device according to claim 4,
   wherein said swing member driving device for rotating said first and second swing member comprises:
   said first and second actuators;
   said first linearly moving member; and
   said second linearly moving member; and
   wherein said first linearly moving member presses said first swing member to cause said first swing member to rotationally move, and said second linearly moving member presses said first swing member to cause said second linearly moving member to rotationally move.

10. The imaging device according to claim 9, further comprising:
    a first rotationally biasing member for rotationally biasing said first swing member in a direction opposite to the pressing direction of said first linearly moving member; and
    a second rotationally biasing member for rotationally biasing said second rotationally moving lever in a direction opposite to the pressing direction of said second linearly moving member.

11. The imaging device according to claim 9,
    wherein said first and second rotational shafts of said first and second actuators extend parallel to each other within a plane orthogonal to said common optical axis, said first actuator and said second actuator being arranged adjacent to each other in a direction perpendicular to the rotation axes of said first and second rotational shafts within said plane which is orthogonal to said common optical axis.

12. The imaging device according to claim 1,
    wherein said image-stabilizing optical element comprises an image sensor positioned at an imaging position of said photographing optical system.

13. The imaging device according to claim 4, further comprising:
    a third swing member, said third swing member being pivotally supported by a third rotation shaft extending parallel to said common optical axis,
    wherein a forward and reverse rotational motion of said third swing member causes said image-stabilizing optical element to move between a photographing position, at which said image-stabilizing optical element is located on said common optical axis, and a radially-retracted position, at which said image-stabilizing optical element is radially retracted away from said common optical axis.

14. An imaging device, comprising:
    an image-shake detector for detecting a direction and magnitude of an amount of vibration applied to a photographing optical system;

first and second movable frames, each for supporting a common image-stabilizing optical element, which constitutes a part of said photographing optical system, so as to be movable in two directions different from each other in a plane orthogonal to a common optical axis of said photographing optical system;

first and second biasing devices for biasing said first and second movable frames, respectively, in the respective moving directions thereof;

a movement extremity determining device for determining movement extremities of said first and second movable frames, in respective biasing directions, in accordance with an output of said image-shake detector, wherein said movement extremity determining device comprises:

a first actuator having a first rotational shaft;

a second actuator having a second rotational shaft;

a first linearly moving member that is moved forward and rearward in a direction parallel to the first rotational shaft of said first actuator by forward and reverse rotations of said first rotational shaft; and a second linearly moving member that is moved forward and rearward in a direction parallel to the second rotational shaft of said second actuator by forward and reverse rotations of said second rotational shaft, wherein the movement extremities of said first and second movable frames are determined in accordance with the positions of said first and second linearly moving members.

* * * * *